(12) United States Patent
Collignon et al.

(10) Patent No.: US 9,022,224 B2
(45) Date of Patent: May 5, 2015

(54) FLUID CONTROL MANIFOLD FOR MEMBRANE FILTRATION SYSTEM

(75) Inventors: Michael Collignon, Annangrove (AU); Bruce Gregory Biltoft, Chatswood (AU)

(73) Assignee: Evoqua Water Technologies LLC, Warrendale, PA (US)

( * ) Notice: Subject to any disclaimer, the term of this patent is extended or adjusted under 35 U.S.C. 154(b) by 838 days.

(21) Appl. No.: 13/240,190

(22) Filed: Sep. 22, 2011

(65) Prior Publication Data

US 2012/0074053 A1     Mar. 29, 2012

(30) Foreign Application Priority Data

Sep. 24, 2010 (AU) .................................. 2010904334

(51) Int. Cl.
| | | |
|---|---|---|
| *B01D 63/00* | (2006.01) | |
| *B01D 25/30* | (2006.01) | |
| *B01D 21/24* | (2006.01) | |
| *B01D 29/88* | (2006.01) | |
| *B01D 29/00* | (2006.01) | |
| *B01D 63/04* | (2006.01) | |
| *B01D 65/02* | (2006.01) | |

(52) U.S. Cl.
CPC .............. *B01D 63/046* (2013.01); *B01D 65/02* (2013.01); *B01D 2313/105* (2013.01); *B01D 2313/125* (2013.01); *B01D 2313/21* (2013.01); *B01D 2313/26* (2013.01); *B01D 2313/54* (2013.01); *B01D 2317/04* (2013.01); *B01D 2317/06* (2013.01); *B01D 2321/185* (2013.01)

(58) Field of Classification Search
CPC ........... B01D 2317/04; B01D 2317/06; B01D 2321/185; A01B 12/006
USPC ................................ 210/456, 321.78–321.9, 210/321.87–321.89, 636, 275, 333.01, 210/321.69
See application file for complete search history.

(56) References Cited

U.S. PATENT DOCUMENTS

| | | |
|---|---|---|
| 256,008 A | 4/1882 | Leak |
| 285,321 A | 9/1883 | Tams |
| 403,507 A | 5/1889 | Bode |
| 511,995 A | 1/1894 | Buckley |

(Continued)

FOREIGN PATENT DOCUMENTS

| | | |
|---|---|---|
| AU | 34400/84 A | 4/1985 |
| AU | 55847/86 A | 9/1986 |

(Continued)

OTHER PUBLICATIONS

Almulla et al., Desalination, 153 (2002), pp. 237-243.

(Continued)

*Primary Examiner* — Ana Fortuna

(57) ABSTRACT

Disclosed herein are apparatus and methods for filtering a fluid including a filter module assembly coupled to a manifold. The manifold may include a manifold inlet in fluid communication with a source of feed liquid, an outlet in fluid communication with header of the filter module assembly, a fluid passageway in fluid communication with the manifold inlet, a source of gas, and the outlet, a second fluid passageway in fluid communication with the header and the first fluid passageway and a second manifold outlet vertically displaced from the first manifold outlet and in fluid communication between the first fluid passageway and the second fluid passageway.

8 Claims, 14 Drawing Sheets

(56) References Cited

U.S. PATENT DOCUMENTS

| | | |
|---|---|---|
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,068,655 A | 12/1962 | Murray et al. |
| 3,139,401 A | 6/1964 | Hach |
| 3,183,191 A | 5/1965 | Hach |
| 3,191,674 A | 6/1965 | Richardson |
| 3,198,636 A | 8/1965 | Bouthilet |
| 3,228,876 A | 1/1966 | Mahon |
| 3,246,761 A | 4/1966 | Bryan et al. |
| 3,275,554 A | 9/1966 | Wagenaar |
| 3,442,002 A | 5/1969 | Geary et al. |
| 3,462,362 A | 8/1969 | Kollsman |
| 3,472,168 A | 10/1969 | Inoue et al. |
| 3,472,765 A | 10/1969 | Budd et al. |
| 3,492,698 A | 2/1970 | Geary et al. |
| 3,501,798 A | 3/1970 | Carraro |
| 3,505,215 A | 4/1970 | Bray |
| 3,556,305 A | 1/1971 | Shorr |
| 3,563,860 A | 2/1971 | Henderyckx |
| 3,591,010 A | 7/1971 | Pall et al. |
| 3,592,450 A | 7/1971 | Rippon |
| 3,625,827 A | 12/1971 | Wildi et al. |
| 3,628,775 A | 12/1971 | McConnell et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,912,624 A | 10/1975 | Jennings |
| 3,937,015 A | 2/1976 | Akado et al. |
| 3,955,998 A | 5/1976 | Clampitt et al. |
| 3,962,095 A | 6/1976 | Luppi |
| 3,968,192 A | 7/1976 | Hoffman, III et al. |
| 3,982,095 A | 9/1976 | Robinson |
| 3,992,301 A | 11/1976 | Shippey et al. |
| 3,993,816 A | 11/1976 | Baudet et al. |
| 4,016,078 A * | 4/1977 | Clark ............................ 210/94 |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,138,460 A | 2/1979 | Tigner |
| 4,157,899 A | 6/1979 | Wheaton |
| 4,169,873 A | 10/1979 | Lipert |
| 4,183,890 A | 1/1980 | Bollinger |
| 4,187,263 A | 2/1980 | Lipert |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,272,379 A | 6/1981 | Pollock |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,371,427 A | 2/1983 | Holler et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,545,862 A | 10/1985 | Gore et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,830 A | 10/1987 | Makino et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,752,421 A | 6/1988 | Makino |
| 4,756,875 A | 7/1988 | Tajima et al. |
| 4,763,612 A | 8/1988 | Iwanami |
| 4,767,539 A | 8/1988 | Ford |
| 4,769,140 A | 9/1988 | van Dijk et al. |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |

(56) References Cited

U.S. PATENT DOCUMENTS

| | | |
|---|---|---|
| 4,812,235 A | 3/1989 | Seleman et al. |
| 4,816,160 A | 3/1989 | Ford et al. |
| 4,824,563 A | 4/1989 | Iwahori et al. |
| 4,828,696 A | 5/1989 | Makino et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,889,620 A | 12/1989 | Schmit et al. |
| 4,904,426 A | 2/1990 | Lundgard et al. |
| 4,908,114 A | 3/1990 | Ayers |
| 4,911,838 A | 3/1990 | Tanaka |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,969,997 A | 11/1990 | Kluver et al. |
| 4,980,066 A | 12/1990 | Slegers |
| 4,988,444 A | 1/1991 | Applegate et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |
| 5,069,353 A | 12/1991 | Espenan |
| 5,075,044 A | 12/1991 | Augem |
| 5,075,065 A | 12/1991 | Effenberger et al. |
| 5,076,925 A | 12/1991 | Roesink et al. |
| 5,079,272 A | 1/1992 | Allegrezza, Jr. et al. |
| 5,080,770 A | 1/1992 | Culkin |
| 5,094,750 A | 3/1992 | Kopp et al. |
| 5,094,867 A | 3/1992 | Detering et al. |
| 5,098,567 A | 3/1992 | Nishiguchi |
| 5,102,550 A | 4/1992 | Pizzino et al. |
| 5,104,535 A | 4/1992 | Cote et al. |
| 5,104,546 A | 4/1992 | Filson et al. |
| H001045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,156,738 A | 10/1992 | Maxson |
| 5,158,721 A | 10/1992 | Allegrezza, Jr. et al. |
| 5,169,528 A | 12/1992 | Karbachsch et al. |
| 5,169,530 A | 12/1992 | Schucker et al. |
| 5,180,407 A | 1/1993 | DeMarco |
| 5,182,019 A | 1/1993 | Cote et al. |
| 5,186,821 A | 2/1993 | Murphy |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |
| 5,198,162 A | 3/1993 | Park et al. |
| 5,203,405 A | 4/1993 | Gentry et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,244,579 A | 9/1993 | Horner et al. |
| 5,248,424 A | 9/1993 | Cote et al. |
| 5,262,054 A | 11/1993 | Wheeler |
| 5,269,919 A | 12/1993 | von Medlin |
| 5,271,830 A | 12/1993 | Faivre et al. |
| 5,275,766 A | 1/1994 | Gadkaree et al. |
| 5,286,324 A | 2/1994 | Kawai et al. |
| 5,290,451 A | 3/1994 | Koster et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,354,470 A | 10/1994 | Seita et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,425,415 A | 6/1995 | Master et al. |
| 5,451,317 A | 9/1995 | Ishida et al. |
| 5,458,779 A | 10/1995 | Odegaard |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,482,625 A | 1/1996 | Shimizu et al. |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A | 3/1997 | Cote et al. |
| 5,626,755 A | 5/1997 | Keyser et al. |
| 5,629,084 A | 5/1997 | Moya |
| 5,633,163 A | 5/1997 | Cameron |
| 5,639,373 A | 6/1997 | Mahendran et al. |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,690,830 A | 11/1997 | Ohtani et al. |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| D396,046 S | 7/1998 | Scheel et al. |
| 5,783,083 A | 7/1998 | Henshaw et al. |
| 5,786,528 A | 7/1998 | Dileo et al. |
| D396,726 S | 8/1998 | Sadr et al. |
| 5,814,234 A | 9/1998 | Bower et al. |
| D400,890 S | 11/1998 | Gambardella |
| 5,843,069 A | 12/1998 | Butler et al. |
| 5,846,424 A | 12/1998 | Khudenko |
| 5,846,425 A | 12/1998 | Whiteman |

(56) References Cited

U.S. PATENT DOCUMENTS

| | | |
|---|---|---|
| 5,871,823 A | 2/1999 | Anders et al. |
| 5,888,401 A | 3/1999 | Nguyen |
| 5,895,521 A | 4/1999 | Otsuka et al. |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,961,830 A | 10/1999 | Barnett |
| 5,968,357 A | 10/1999 | Doelle et al. |
| 5,988,400 A | 11/1999 | Karachevtcev et al. |
| 5,989,428 A | 11/1999 | Goronszy |
| 5,997,745 A | 12/1999 | Tonelli et al. |
| 6,001,254 A | 12/1999 | Espenan et al. |
| 6,007,712 A | 12/1999 | Tanaka et al. |
| 6,017,451 A | 1/2000 | Kopf |
| 6,024,872 A | 2/2000 | Mahendran et al. |
| 6,036,030 A | 3/2000 | Stone et al. |
| 6,039,872 A | 3/2000 | Wu et al. |
| 6,042,677 A | 3/2000 | Mahendran et al. |
| 6,045,698 A | 4/2000 | Cote et al. |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,071,404 A | 6/2000 | Tsui |
| 6,074,718 A | 6/2000 | Puglia et al. |
| 6,077,435 A | 6/2000 | Beck et al. |
| 6,083,393 A | 7/2000 | Wu et al. |
| 6,096,213 A | 8/2000 | Radovanovic et al. |
| 6,113,782 A | 9/2000 | Leonard |
| 6,120,688 A | 9/2000 | Daly et al. |
| 6,126,819 A | 10/2000 | Heine et al. |
| 6,146,747 A | 11/2000 | Wang et al. |
| 6,149,817 A | 11/2000 | Peterson et al. |
| 6,156,200 A | 12/2000 | Zha et al. |
| 6,159,373 A | 12/2000 | Beck et al. |
| 6,162,020 A | 12/2000 | Kondo |
| 6,193,890 B1 | 2/2001 | Pedersen et al. |
| 6,202,475 B1 | 3/2001 | Selbie et al. |
| 6,214,231 B1 | 4/2001 | Cote et al. |
| 6,214,232 B1 | 4/2001 | Baurmeister et al. |
| 6,217,770 B1 | 4/2001 | Haney et al. |
| 6,221,247 B1 | 4/2001 | Nemser et al. |
| 6,224,767 B1 | 5/2001 | Fujiwara et al. |
| 6,245,239 B1 | 6/2001 | Cote et al. |
| 6,254,773 B1 | 7/2001 | Biltoft |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,290,756 B1 | 9/2001 | Macheras et al. |
| 6,294,039 B1 | 9/2001 | Mahendran et al. |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,319,411 B1 | 11/2001 | Cote |
| 6,322,703 B1 | 11/2001 | Taniguchi et al. |
| 6,324,898 B1 | 12/2001 | Cote et al. |
| 6,325,928 B1 | 12/2001 | Pedersen et al. |
| 6,325,938 B1 | 12/2001 | Miyashita et al. |
| 6,331,248 B1 | 12/2001 | Taniguchi et al. |
| 6,337,018 B1 | 1/2002 | Mickols |
| RE37,549 E | 2/2002 | Mahendran et al. |
| 6,349,835 B1 | 2/2002 | Saux et al. |
| 6,354,444 B1 | 3/2002 | Mahendran et al. |
| 6,361,695 B1 | 3/2002 | Husain et al. |
| 6,368,819 B1 | 4/2002 | Gaddy et al. |
| 6,372,138 B1 | 4/2002 | Cho et al. |
| 6,375,848 B1 | 4/2002 | Cote et al. |
| 6,383,369 B2 | 5/2002 | Elston |
| 6,387,189 B1 | 5/2002 | Groschl et al. |
| 6,402,955 B2 | 6/2002 | Ookata |
| 6,406,629 B1 | 6/2002 | Husain et al. |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,471,869 B1 | 10/2002 | Yanou et al. |
| 6,485,645 B1 | 11/2002 | Husain et al. |
| 6,495,041 B2 | 12/2002 | Taniguchi et al. |
| 6,517,723 B1 | 2/2003 | Daigger et al. |
| 6,524,481 B2 | 2/2003 | Zha et al. |
| 6,524,733 B1 | 2/2003 | Nonobe |
| 6,550,747 B2 | 4/2003 | Rabie et al. |
| 6,555,005 B1 | 4/2003 | Zha et al. |
| 6,562,237 B1 | 5/2003 | Olaopa |
| 6,576,136 B1 | 6/2003 | De Moel et al. |
| 6,592,762 B2 | 7/2003 | Smith |
| D478,913 S | 8/2003 | Johnson et al. |
| 6,613,222 B2 | 9/2003 | Mikkelson et al. |
| 6,620,319 B2 | 9/2003 | Behmann et al. |
| 6,623,643 B2 | 9/2003 | Chisholm et al. |
| 6,627,082 B2 | 9/2003 | Del Vecchio et al. |
| 6,632,358 B1 | 10/2003 | Suga et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,185 B2 | 3/2004 | Goel et al. |
| 6,706,189 B2 | 3/2004 | Rabie et al. |
| 6,708,957 B2 | 3/2004 | Cote et al. |
| 6,712,970 B1 | 3/2004 | Trivedi |
| 6,721,529 B2 | 4/2004 | Chen et al. |
| 6,723,242 B1 | 4/2004 | Ohkata et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,755,970 B1 | 6/2004 | Knappe et al. |
| 6,758,972 B2 | 7/2004 | Vriens et al. |
| 6,761,826 B2 | 7/2004 | Bender |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,347 B2 | 9/2004 | Jeong et al. |
| 6,790,912 B2 | 9/2004 | Blong |
| 6,805,806 B2 | 10/2004 | Arnaud |
| 6,808,629 B2 | 10/2004 | Wouters-Wasiak et al. |
| 6,811,696 B2 | 11/2004 | Wang et al. |
| 6,814,861 B2 | 11/2004 | Husain et al. |
| 6,821,420 B2 | 11/2004 | Zha et al. |
| 6,830,782 B2 | 12/2004 | Kanazawa |
| 6,840,251 B2 | 1/2005 | Gill et al. |
| 6,841,070 B2 | 1/2005 | Zha et al. |
| 6,861,466 B2 | 3/2005 | Dadalas et al. |
| 6,863,816 B2 | 3/2005 | Austin et al. |
| 6,863,817 B2 | 3/2005 | Liu et al. |
| 6,863,818 B2 | 3/2005 | Daigger et al. |
| 6,863,823 B2 | 3/2005 | Cote |
| 6,869,534 B2 | 3/2005 | McDowell et al. |
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,936,085 B2 | 8/2005 | DeMarco |
| 6,946,073 B2 | 9/2005 | Daigger et al. |
| 6,952,258 B2 | 10/2005 | Ebert et al. |

(56) References Cited

U.S. PATENT DOCUMENTS

| | | | |
|---|---|---|---|
| 6,955,762 B2 | 10/2005 | Gallagher et al. | |
| 6,962,258 B2 | 11/2005 | Zha et al. | |
| 6,964,741 B2 | 11/2005 | Mahendran et al. | |
| 6,969,465 B2 | 11/2005 | Zha et al. | |
| 6,974,554 B2 | 12/2005 | Cox et al. | |
| 6,994,867 B1 | 2/2006 | Hossainy et al. | |
| 7,005,100 B2 | 2/2006 | Lowell | |
| 7,014,763 B2 | 3/2006 | Johnson et al. | |
| 7,018,530 B2 | 3/2006 | Pollock | |
| 7,018,533 B2 | 3/2006 | Johnson et al. | |
| 7,022,233 B2 | 4/2006 | Chen | |
| 7,041,728 B2 | 5/2006 | Zipplies et al. | |
| 7,052,610 B2 | 5/2006 | Janson et al. | |
| 7,083,733 B2 | 8/2006 | Freydina et al. | |
| 7,087,173 B2 | 8/2006 | Cote et al. | |
| 7,122,121 B1 | 10/2006 | Ji | |
| 7,147,777 B1 | 12/2006 | Porteous | |
| 7,147,778 B1 | 12/2006 | DiMassimo et al. | |
| 7,160,455 B2 * | 1/2007 | Taniguchi et al. | 210/321.88 |
| 7,160,463 B2 | 1/2007 | Beck et al. | |
| 7,160,464 B2 | 1/2007 | Lee et al. | |
| 7,172,699 B1 | 2/2007 | Trivedi et al. | |
| 7,172,701 B2 | 2/2007 | Gaid et al. | |
| 7,186,344 B2 | 3/2007 | Hughes | |
| 7,208,091 B2 | 4/2007 | Pind et al. | |
| 7,223,340 B2 | 5/2007 | Zha et al. | |
| 7,226,541 B2 | 6/2007 | Muller et al. | |
| 7,247,238 B2 | 7/2007 | Mullette et al. | |
| 7,264,716 B2 | 9/2007 | Johnson et al. | |
| 7,279,100 B2 | 10/2007 | Devine | |
| 7,279,215 B2 | 10/2007 | Hester et al. | |
| 7,300,022 B2 | 11/2007 | Muller | |
| 7,314,563 B2 | 1/2008 | Cho et al. | |
| 7,329,344 B2 | 2/2008 | Jordan et al. | |
| 7,344,645 B2 | 3/2008 | Beck et al. | |
| 7,361,274 B2 | 4/2008 | Lazaredes | |
| 7,378,024 B2 | 5/2008 | Bartels et al. | |
| 7,387,723 B2 | 6/2008 | Jordan | |
| 7,404,896 B2 | 7/2008 | Muller | |
| 7,410,584 B2 | 8/2008 | Devine | |
| 7,455,765 B2 | 11/2008 | Elefritz et al. | |
| 7,481,933 B2 | 1/2009 | Barnes | |
| 7,507,274 B2 | 3/2009 | Tonkovich et al. | |
| 7,510,655 B2 | 3/2009 | Barnes | |
| 7,531,042 B2 | 5/2009 | Murkute et al. | |
| 7,563,363 B2 | 7/2009 | Kuzma | |
| 7,591,950 B2 | 9/2009 | Zha et al. | |
| 7,632,439 B2 | 12/2009 | Mullette et al. | |
| 7,648,634 B2 | 1/2010 | Probst | |
| 7,662,212 B2 | 2/2010 | Mullette et al. | |
| 7,708,887 B2 | 5/2010 | Johnson et al. | |
| 7,713,413 B2 | 5/2010 | Barnes | |
| 7,718,057 B2 | 5/2010 | Jordan et al. | |
| 7,718,065 B2 | 5/2010 | Jordan | |
| 7,722,769 B2 | 5/2010 | Jordan et al. | |
| 7,761,826 B1 | 7/2010 | Thanvantri et al. | |
| 7,819,956 B2 | 10/2010 | Muller | |
| 7,850,851 B2 | 12/2010 | Zha et al. | |
| 7,862,719 B2 | 1/2011 | McMahon et al. | |
| 7,931,463 B2 | 4/2011 | Cox et al. | |
| 7,938,966 B2 * | 5/2011 | Johnson | 210/636 |
| 2001/0047962 A1 | 12/2001 | Zha et al. | |
| 2001/0052494 A1 | 12/2001 | Cote et al. | |
| 2002/0027111 A1 | 3/2002 | Ando et al. | |
| 2002/0070157 A1 | 6/2002 | Yamada | |
| 2002/0117444 A1 | 8/2002 | Mikkelson et al. | |
| 2002/0148767 A1 | 10/2002 | Johnson et al. | |
| 2002/0153313 A1 | 10/2002 | Cote | |
| 2002/0185435 A1 | 12/2002 | Husain et al. | |
| 2002/0189999 A1 | 12/2002 | Espenan et al. | |
| 2002/0195390 A1 | 12/2002 | Zha et al. | |
| 2003/0038080 A1 | 2/2003 | Vriens et al. | |
| 2003/0042199 A1 | 3/2003 | Smith | |
| 2003/0052055 A1 | 3/2003 | Akamatsu et al. | |
| 2003/0056919 A1 | 3/2003 | Beck | |
| 2003/0057155 A1 | 3/2003 | Husain et al. | |
| 2003/0062301 A1 | 4/2003 | Merrie et al. | |
| 2003/0075495 A1 | 4/2003 | Dannstrom et al. | |
| 2003/0075504 A1 | 4/2003 | Zha et al. | |
| 2003/0121855 A1 | 7/2003 | Kopp | |
| 2003/0127388 A1 | 7/2003 | Ando et al. | |
| 2003/0146153 A1 | 8/2003 | Cote et al. | |
| 2003/0150807 A1 | 8/2003 | Bartels et al. | |
| 2003/0159988 A1 | 8/2003 | Daigger et al. | |
| 2003/0178365 A1 | 9/2003 | Zha et al. | |
| 2003/0196955 A1 | 10/2003 | Hughes | |
| 2003/0226797 A1 | 12/2003 | Phelps | |
| 2003/0234221 A1 | 12/2003 | Johnson et al. | |
| 2004/0007523 A1 | 1/2004 | Gabon et al. | |
| 2004/0007525 A1 | 1/2004 | Rabie et al. | |
| 2004/0035770 A1 | 2/2004 | Edwards et al. | |
| 2004/0035779 A1 | 2/2004 | Vossenkaul et al. | |
| 2004/0045893 A1 | 3/2004 | Watanabe et al. | |
| 2004/0050791 A1 | 3/2004 | Herczeg | |
| 2004/0055974 A1 | 3/2004 | Del Vecchio et al. | |
| 2004/0084369 A1 | 5/2004 | Zha et al. | |
| 2004/0108268 A1 | 6/2004 | Liu et al. | |
| 2004/0112831 A1 | 6/2004 | Rabie et al. | |
| 2004/0139992 A1 | 7/2004 | Murkute et al. | |
| 2004/0145076 A1 | 7/2004 | Zha et al. | |
| 2004/0149655 A1 | 8/2004 | Petrucco et al. | |
| 2004/0154671 A1 | 8/2004 | Martins et al. | |
| 2004/0168978 A1 | 9/2004 | Gray | |
| 2004/0168979 A1 | 9/2004 | Zha et al. | |
| 2004/0173525 A1 | 9/2004 | Hunniford et al. | |
| 2004/0178136 A1 * | 9/2004 | Taniguchi et al. | 210/321.79 |
| 2004/0178154 A1 | 9/2004 | Zha et al. | |
| 2004/0188339 A1 * | 9/2004 | Murkute et al. | 210/321.8 |
| 2004/0188341 A1 | 9/2004 | Zha et al. | |
| 2004/0211726 A1 | 10/2004 | Baig et al. | |
| 2004/0217053 A1 | 11/2004 | Zha et al. | |
| 2004/0222158 A1 | 11/2004 | Husain et al. | |
| 2004/0232076 A1 | 11/2004 | Zha et al. | |
| 2004/0238442 A1 | 12/2004 | Johnson et al. | |
| 2004/0245174 A1 | 12/2004 | Takayama et al. | |
| 2005/0000885 A1 * | 1/2005 | Stockbower | 210/435 |
| 2005/0006308 A1 | 1/2005 | Cote et al. | |
| 2005/0023219 A1 | 2/2005 | Kirker et al. | |
| 2005/0029185 A1 | 2/2005 | Muller | |
| 2005/0029186 A1 | 2/2005 | Muller | |
| 2005/0032982 A1 | 2/2005 | Muller | |
| 2005/0045557 A1 | 3/2005 | Daigger et al. | |
| 2005/0053878 A1 | 3/2005 | Bruun et al. | |
| 2005/0061725 A1 | 3/2005 | Liu et al. | |
| 2005/0077227 A1 | 4/2005 | Kirker et al. | |
| 2005/0092674 A1 | 5/2005 | Mahendran et al. | |
| 2005/0098494 A1 | 5/2005 | Mullette et al. | |
| 2005/0103722 A1 | 5/2005 | Freydina et al. | |
| 2005/0109692 A1 | 5/2005 | Zha et al. | |
| 2005/0115880 A1 | 6/2005 | Pollock | |
| 2005/0115899 A1 | 6/2005 | Liu et al. | |
| 2005/0121389 A1 | 6/2005 | Janson et al. | |
| 2005/0126963 A1 | 6/2005 | Phagoo et al. | |
| 2005/0139538 A1 | 6/2005 | Lazaredes | |
| 2005/0184008 A1 | 8/2005 | Schacht et al. | |
| 2005/0194305 A1 | 9/2005 | Vido et al. | |
| 2005/0194310 A1 | 9/2005 | Yamamoto et al. | |
| 2005/0194315 A1 | 9/2005 | Adams et al. | |
| 2005/0258098 A1 | 11/2005 | Vincent et al. | |
| 2006/0000775 A1 | 1/2006 | Zha et al. | |
| 2006/0021929 A1 | 2/2006 | Mannheim et al. | |
| 2006/0065596 A1 | 3/2006 | Kent et al. | |
| 2006/0081533 A1 | 4/2006 | Khudenko | |
| 2006/0131234 A1 | 6/2006 | Zha et al. | |
| 2006/0201876 A1 | 9/2006 | Jordan | |
| 2006/0201879 A1 | 9/2006 | Den Boestert et al. | |
| 2006/0249448 A1 | 11/2006 | Fujishima et al. | |
| 2006/0249449 A1 | 11/2006 | Nakhla et al. | |
| 2006/0261007 A1 | 11/2006 | Zha et al. | |
| 2006/0273007 A1 | 12/2006 | Zha et al. | |
| 2006/0273038 A1 | 12/2006 | Syed et al. | |
| 2007/0007205 A1 | 1/2007 | Johnson et al. | |
| 2007/0007207 A1 | 1/2007 | Mahendran et al. | |
| 2007/0007214 A1 | 1/2007 | Zha et al. | |

(56) References Cited

U.S. PATENT DOCUMENTS

| | | |
|---|---|---|
| 2007/0039888 A1 | 2/2007 | Ginzburg et al. |
| 2007/0045183 A1 | 3/2007 | Murphy |
| 2007/0051679 A1 | 3/2007 | Adams et al. |
| 2007/0056904 A1 | 3/2007 | Hogt et al. |
| 2007/0056905 A1 | 3/2007 | Beck et al. |
| 2007/0075017 A1 | 4/2007 | Kuzma |
| 2007/0075021 A1 | 4/2007 | Johnson |
| 2007/0084791 A1 | 4/2007 | Jordan et al. |
| 2007/0084795 A1 | 4/2007 | Jordan |
| 2007/0095741 A1 | 5/2007 | Berends |
| 2007/0102339 A1* | 5/2007 | Cote et al. ............... 210/321.69 |
| 2007/0108125 A1 | 5/2007 | Cho et al. |
| 2007/0131614 A1 | 6/2007 | Knappe et al. |
| 2007/0138090 A1 | 6/2007 | Jordan et al. |
| 2007/0170112 A1 | 7/2007 | Elefritz et al. |
| 2007/0181496 A1 | 8/2007 | Zuback |
| 2007/0227973 A1 | 10/2007 | Zha et al. |
| 2008/0053923 A1 | 3/2008 | Beck et al. |
| 2008/0093297 A1 | 4/2008 | Gock et al. |
| 2008/0156745 A1 | 7/2008 | Zha et al. |
| 2008/0179249 A1 | 7/2008 | Beck et al. |
| 2008/0190846 A1 | 8/2008 | Cox et al. |
| 2008/0203016 A1 | 8/2008 | Johnson et al. |
| 2008/0203017 A1 | 8/2008 | Zha et al. |
| 2008/0257822 A1 | 10/2008 | Johnson |
| 2008/0277340 A1 | 11/2008 | Hong et al. |
| 2009/0001018 A1 | 1/2009 | Zha et al. |
| 2009/0194477 A1 | 8/2009 | Hashimoto |
| 2009/0223895 A1 | 9/2009 | Zha et al. |
| 2009/0255873 A1 | 10/2009 | Biltoft et al. |
| 2010/0000941 A1 | 1/2010 | Muller |
| 2010/0012585 A1 | 1/2010 | Zha et al. |
| 2010/0025320 A1 | 2/2010 | Johnson |
| 2010/0051545 A1 | 3/2010 | Johnson et al. |
| 2010/0170847 A1 | 7/2010 | Zha et al. |
| 2010/0200503 A1 | 8/2010 | Zha et al. |
| 2010/0300968 A1 | 12/2010 | Liu et al. |
| 2010/0326906 A1 | 12/2010 | Barnes |
| 2011/0023913 A1 | 2/2011 | Fulling |
| 2011/0049047 A1 | 3/2011 | Cumin et al. |
| 2011/0049048 A1 | 3/2011 | Benner et al. |
| 2011/0056522 A1 | 3/2011 | Zauner et al. |
| 2011/0100907 A1 | 5/2011 | Zha et al. |
| 2011/0114557 A2 | 5/2011 | Johnson et al. |
| 2011/0127209 A1 | 6/2011 | Rogers et al. |
| 2011/0132826 A1 | 6/2011 | Muller et al. |
| 2011/0139715 A1 | 6/2011 | Zha et al. |
| 2011/0192783 A1 | 8/2011 | Cox et al. |
| 2011/0198283 A1 | 8/2011 | Zha et al. |
| 2012/0074053 A1* | 3/2012 | Collignon et al. ............ 210/209 |
| 2012/0091602 A1 | 4/2012 | Cumin et al. |
| 2012/0187044 A1 | 7/2012 | Zha et al. |
| 2012/0285885 A1 | 11/2012 | James et al. |
| 2013/0037467 A1 | 2/2013 | Biltoft et al. |
| 2013/0056426 A1 | 3/2013 | Barnes |
| 2013/0153496 A1 | 6/2013 | Zha et al. |

FOREIGN PATENT DOCUMENTS

| | | |
|---|---|---|
| AU | 77066/87 A | 2/1988 |
| AU | 762091 B2 | 6/2003 |
| AU | 2004289373 A1 | 5/2005 |
| CA | 2460207 A1 | 3/2003 |
| CA | 2531764 A1 | 3/2005 |
| CN | 86104888 A | 2/1988 |
| CN | 1050770 | 1/1995 |
| CN | 2204898 Y | 8/1995 |
| CN | 2236049 Y | 9/1996 |
| CN | 1159769 A | 9/1997 |
| CN | 1244814 A | 2/2000 |
| CN | 1249698 A | 4/2000 |
| CN | 1265636 A | 9/2000 |
| CN | 1319032 A | 10/2001 |
| CN | 1468140 A | 1/2004 |
| CN | 1541757 A | 11/2004 |
| CN | 1735452 A | 2/2006 |
| CN | 101039739 A | 9/2007 |
| CN | 101052457 A | 10/2007 |
| CN | 101287538 A | 10/2008 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 4326603 A1 | 2/1995 |
| DE | 19503060 A1 | 8/1996 |
| DE | 29804927 U1 | 6/1998 |
| DE | 29906389 U1 | 6/1999 |
| DE | 10045227 C1 | 2/2002 |
| DE | 10209170 C1 | 8/2003 |
| DE | 202004012693 U1 | 10/2004 |
| EP | 012557 B1 | 2/1983 |
| EP | 126714 A2 | 11/1984 |
| EP | 050447 B1 | 10/1985 |
| EP | 194735 A2 | 9/1986 |
| EP | 250337 B1 | 12/1987 |
| EP | 327025 A1 | 8/1989 |
| EP | 344633 A1 | 12/1989 |
| EP | 090383 B1 | 5/1990 |
| EP | 407900 A2 | 1/1991 |
| EP | 463627 A2 | 1/1992 |
| EP | 0464321 A1 | 1/1992 |
| EP | 492942 A2 | 7/1992 |
| EP | 518250 B1 | 12/1992 |
| EP | 547575 A1 | 6/1993 |
| EP | 280052 B1 | 7/1994 |
| EP | 395133 B1 | 2/1995 |
| EP | 662341 A1 | 7/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 848194 A2 | 6/1998 |
| EP | 855214 A1 | 7/1998 |
| EP | 627255 B1 | 1/1999 |
| EP | 911073 A1 | 4/1999 |
| EP | 920904 A2 | 6/1999 |
| EP | 0937494 A2 | 8/1999 |
| EP | 1034835 A1 | 9/2000 |
| EP | 1052012 A1 | 11/2000 |
| EP | 1156015 A1 | 11/2001 |
| EP | 1300186 A1 | 4/2003 |
| EP | 1349644 B1 | 10/2003 |
| EP | 1350555 A1 | 10/2003 |
| EP | 1236503 B1 | 8/2004 |
| EP | 1445240 | 8/2004 |
| EP | 1466658 A1 | 10/2004 |
| EP | 1659171 A1 | 5/2006 |
| EP | 1420874 B1 | 1/2011 |
| FR | 2620712 A1 | 3/1989 |
| FR | 2674448 A1 | 10/1992 |
| FR | 2699424 A1 | 6/1994 |
| FR | 2762834 A1 | 11/1998 |
| GB | 702911 A | 1/1954 |
| GB | 996195 A | 6/1965 |
| GB | 2253572 A | 9/1992 |
| JP | 52-078677 A | 7/1977 |
| JP | 53108882 A | 9/1978 |
| JP | 54162684 A | 12/1979 |
| JP | 55099703 A | 7/1980 |
| JP | 55129107 A | 10/1980 |
| JP | 55129155 A | 10/1980 |
| JP | 56021604 A | 2/1981 |
| JP | 56118701 A | 9/1981 |
| JP | 56121685 A | 9/1981 |
| JP | 57190697 A | 11/1982 |
| JP | 58088007 A | 5/1983 |
| JP | 60019002 A | 1/1985 |
| JP | 60-206412 A | 10/1985 |
| JP | 60260628 A | 12/1985 |
| JP | 61097005 A | 5/1986 |
| JP | 61097006 A | 5/1986 |
| JP | 61107905 A | 5/1986 |

(56) References Cited

FOREIGN PATENT DOCUMENTS

| | | |
|---|---|---|
| JP | 61167406 A | 7/1986 |
| JP | 61167407 A | 7/1986 |
| JP | 61171504 A | 8/1986 |
| JP | 61192309 A | 8/1986 |
| JP | 61222510 A | 10/1986 |
| JP | 61242607 A | 10/1986 |
| JP | 61249505 A | 11/1986 |
| JP | 61257203 A | 11/1986 |
| JP | 61263605 A | 11/1986 |
| JP | 61291007 A | 12/1986 |
| JP | 61293504 A | 12/1986 |
| JP | 53-5077 | 1/1987 |
| JP | 62004408 A | 1/1987 |
| JP | 62068828 A | 3/1987 |
| JP | 62114609 A | 5/1987 |
| JP | 62140607 A | 6/1987 |
| JP | 62144708 A | 6/1987 |
| JP | 62163708 A | 7/1987 |
| JP | 62179540 A | 8/1987 |
| JP | 62237908 A | 10/1987 |
| JP | 62250908 A | 10/1987 |
| JP | 62187606 | 11/1987 |
| JP | 62262710 A | 11/1987 |
| JP | 63-93307 | 4/1988 |
| JP | 63097634 A | 4/1988 |
| JP | 63099246 A | 4/1988 |
| JP | 63143905 A | 6/1988 |
| JP | 63-1602 | 7/1988 |
| JP | 63171607 A | 7/1988 |
| JP | 63180254 A | 7/1988 |
| JP | S63-38884 | 10/1988 |
| JP | 64-075542 A | 3/1989 |
| JP | 1-501046 T | 4/1989 |
| JP | 1111494 A | 4/1989 |
| JP | 01-151906 A | 6/1989 |
| JP | 01-307409 A | 12/1989 |
| JP | 02-017924 | 1/1990 |
| JP | 02-017925 | 1/1990 |
| JP | 02-026625 A | 1/1990 |
| JP | 02-031200 A | 2/1990 |
| JP | 02-040296 A | 2/1990 |
| JP | 02-107318 A | 4/1990 |
| JP | 02-126922 A | 5/1990 |
| JP | 02-144132 A | 6/1990 |
| JP | 02-164423 A | 6/1990 |
| JP | 02-174918 A | 7/1990 |
| JP | 02-241523 A | 9/1990 |
| JP | 02-277528 A | 11/1990 |
| JP | 02-284035 A | 11/1990 |
| JP | 03-018373 A | 1/1991 |
| JP | 03-028797 A | 2/1991 |
| JP | 03-086529 A | 4/1991 |
| JP | 03-110445 A | 5/1991 |
| JP | 04-108518 A | 4/1992 |
| JP | 04-110023 A | 4/1992 |
| JP | 04-187224 A | 7/1992 |
| JP | 4-190889 A | 7/1992 |
| JP | 04-250898 A | 9/1992 |
| JP | 04-256424 A | 9/1992 |
| JP | 4-256425 A | 9/1992 |
| JP | 04-265128 A | 9/1992 |
| JP | 04-293527 A | 10/1992 |
| JP | 04-310223 A | 11/1992 |
| JP | 04-317793 A | 11/1992 |
| JP | 04-334530 A | 11/1992 |
| JP | 04-348252 A | 12/1992 |
| JP | 05-4030 | 1/1993 |
| JP | 05-023557 A | 2/1993 |
| JP | 05-096136 A | 4/1993 |
| JP | 05-137977 A | 6/1993 |
| JP | 05-157654 A | 6/1993 |
| JP | 05-161831 A | 6/1993 |
| JP | 05184884 A | 7/1993 |
| JP | 05-279447 A | 10/1993 |
| JP | 05-285348 A | 11/1993 |
| JP | 05-305221 A | 11/1993 |
| JP | 06-027215 A | 2/1994 |
| JP | 06-071120 A | 3/1994 |
| JP | 06-114240 A | 4/1994 |
| JP | 06-170364 A | 6/1994 |
| JP | 06190250 A | 7/1994 |
| JP | 06-218237 A | 8/1994 |
| JP | 06238273 A | 8/1994 |
| JP | 06-277469 A | 10/1994 |
| JP | 06-285496 A | 10/1994 |
| JP | 06292820 A | 10/1994 |
| JP | 06-343837 A | 12/1994 |
| JP | 07-000770 A | 1/1995 |
| JP | 07-024272 A | 1/1995 |
| JP | 07-047247 A | 2/1995 |
| JP | 07-068139 A | 3/1995 |
| JP | 07-136470 A | 5/1995 |
| JP | 07-136471 A | 5/1995 |
| JP | 07-155564 A | 6/1995 |
| JP | 07-155758 A | 6/1995 |
| JP | 7-39921 | 7/1995 |
| JP | 07-178323 A | 7/1995 |
| JP | 07-185268 A | 7/1995 |
| JP | 07-185270 A | 7/1995 |
| JP | 07-185271 A | 7/1995 |
| JP | 07-185272 A | 7/1995 |
| JP | 07204635 A | 8/1995 |
| JP | 07-236819 A | 9/1995 |
| JP | 07-251043 A | 10/1995 |
| JP | 07-256253 | 10/1995 |
| JP | 07-275665 A | 10/1995 |
| JP | 07-289860 A | 11/1995 |
| JP | 07-303895 A | 11/1995 |
| JP | 07-313973 A | 12/1995 |
| JP | 08-010585 A | 1/1996 |
| JP | 8039089 A | 2/1996 |
| JP | 08197053 A | 8/1996 |
| JP | 08-323161 A | 12/1996 |
| JP | 08-332357 A | 12/1996 |
| JP | 09-000890 A | 1/1997 |
| JP | 09-038470 A | 2/1997 |
| JP | 09038648 A | 2/1997 |
| JP | 09-072993 A | 3/1997 |
| JP | 09075689 A | 3/1997 |
| JP | 09-099227 A | 4/1997 |
| JP | 09103655 A | 4/1997 |
| JP | 09103661 A | 4/1997 |
| JP | 9117647 A | 5/1997 |
| JP | 9138298 A | 5/1997 |
| JP | 09-141063 A | 6/1997 |
| JP | 09-155345 A | 6/1997 |
| JP | 09-187628 A | 7/1997 |
| JP | 09-192458 A | 7/1997 |
| JP | 09-220569 A | 8/1997 |
| JP | 09-271641 A | 10/1997 |
| JP | 09-324067 A | 12/1997 |
| JP | 09313902 A | 12/1997 |
| JP | 10-024222 A | 1/1998 |
| JP | 10015365 A | 1/1998 |
| JP | 10-033955 A | 2/1998 |
| JP | 10-048466 A | 2/1998 |
| JP | 10-076144 A | 3/1998 |
| JP | 10-076264 A | 3/1998 |
| JP | 10066972 A | 3/1998 |
| JP | 10-085562 A | 4/1998 |
| JP | 10-085565 A | 4/1998 |
| JP | 10085566 A | 4/1998 |
| JP | 10-156149 A | 6/1998 |
| JP | 10-180048 A | 7/1998 |
| JP | 10-225685 A | 8/1998 |
| JP | 10-235168 A | 9/1998 |
| JP | 10249171 A | 9/1998 |
| JP | 10-286441 A | 10/1998 |
| JP | 10-328538 A | 12/1998 |
| JP | 11-005023 A | 1/1999 |
| JP | 11-028467 A | 2/1999 |
| JP | 11-031025 A | 2/1999 |
| JP | 11-033365 A | 2/1999 |
| JP | 11-033367 A | 2/1999 |

(56) References Cited

FOREIGN PATENT DOCUMENTS

| | | |
|---|---|---|
| JP | 11028339 A | 2/1999 |
| JP | 11-076769 A | 3/1999 |
| JP | 11076770 A | 3/1999 |
| JP | 11090189 A | 4/1999 |
| JP | 11-156166 A | 6/1999 |
| JP | 11-156360 A | 6/1999 |
| JP | 11-165200 A | 6/1999 |
| JP | 11-179171 A | 7/1999 |
| JP | 11-302438 A | 11/1999 |
| JP | 11-319501 A | 11/1999 |
| JP | 11-319507 A | 11/1999 |
| JP | 11300177 A | 11/1999 |
| JP | 11309351 A | 11/1999 |
| JP | 11-333265 A | 12/1999 |
| JP | 2000-000439 A | 1/2000 |
| JP | 2000-051669 A | 2/2000 |
| JP | 2000-061466 A | 2/2000 |
| JP | 200051670 | 2/2000 |
| JP | 2000-070684 A | 3/2000 |
| JP | 2000-79390 A | 3/2000 |
| JP | 2000-093758 | 4/2000 |
| JP | 2000-157845 | 6/2000 |
| JP | 2000-157850 A | 6/2000 |
| JP | 2000-185220 A | 7/2000 |
| JP | 2000-189958 A | 7/2000 |
| JP | 2000-233020 A | 8/2000 |
| JP | 2000-237548 A | 9/2000 |
| JP | 2000-300968 A | 10/2000 |
| JP | 2000-317276 A | 11/2000 |
| JP | 2000-342932 A | 12/2000 |
| JP | 2000334276 A | 12/2000 |
| JP | 2001-009246 A | 1/2001 |
| JP | 2001-070967 A | 3/2001 |
| JP | 2001-079366 A | 3/2001 |
| JP | 2001-079367 A | 3/2001 |
| JP | 2001-104760 A | 4/2001 |
| JP | 2001-120963 A | 5/2001 |
| JP | 2001-179059 A | 7/2001 |
| JP | 2001-179060 A | 7/2001 |
| JP | 2001-190937 A | 7/2001 |
| JP | 2001-190938 A | 7/2001 |
| JP | 2001-205055 A | 7/2001 |
| JP | 2001-510396 T | 7/2001 |
| JP | 2001212587 A | 8/2001 |
| JP | 2001232160 A | 8/2001 |
| JP | 2001-269546 | 10/2001 |
| JP | 2002011472 A | 1/2002 |
| JP | 2002143849 A | 5/2002 |
| JP | 2002-177746 A | 6/2002 |
| JP | 3302992 B2 | 7/2002 |
| JP | 2002-527229 A | 8/2002 |
| JP | 2002525197 T | 8/2002 |
| JP | 2002-263407 A | 9/2002 |
| JP | 2002-336663 | 11/2002 |
| JP | 2003024751 | 1/2003 |
| JP | 2003047830 A | 2/2003 |
| JP | 2003053157 A | 2/2003 |
| JP | 2003053160 A | 2/2003 |
| JP | 200371254 A | 3/2003 |
| JP | 2003062436 A | 3/2003 |
| JP | 2003135935 A | 5/2003 |
| JP | 2003190976 A | 7/2003 |
| JP | 2003-265597 | 9/2003 |
| JP | 2003-275548 A | 9/2003 |
| JP | 2003266072 A | 9/2003 |
| JP | 2003275759 A | 9/2003 |
| JP | 2003340250 A | 12/2003 |
| JP | 2004-008981 | 1/2004 |
| JP | 2004073950 A | 3/2004 |
| JP | 2004-230287 A | 8/2004 |
| JP | 2004216263 A | 8/2004 |
| JP | 2004230280 A | 8/2004 |
| JP | 2004249168 A | 9/2004 |
| JP | 2004322100 A | 11/2004 |
| JP | 2004337730 A | 12/2004 |
| JP | 2004536710 A | 12/2004 |
| JP | 2005502467 A | 1/2005 |
| JP | 2005087887 A | 4/2005 |
| JP | 2005144291 A | 6/2005 |
| JP | 2005154551 A | 6/2005 |
| JP | 2005279447 A | 10/2005 |
| JP | 2006-116495 | 5/2006 |
| JP | 2007-547083 | 8/2010 |
| JP | 4833353 B2 | 12/2011 |
| KR | 20-0232145 | 7/2001 |
| KR | 1020020067227 | 8/2002 |
| KR | 20-0295350 | 11/2002 |
| KR | 2002-0090967 | 12/2002 |
| KR | 2003-033812 | 5/2003 |
| KR | 2003-060625 | 7/2003 |
| KR | 20030066271 | 8/2003 |
| KR | 20030097167 | 12/2003 |
| KR | 2005-063478 | 6/2005 |
| NL | 1006390 C2 | 12/1998 |
| NL | 1020491 C | 10/2003 |
| NL | 1021197 C | 10/2003 |
| NO | 20053769 A | 2/2006 |
| NZ | 510394 A | 5/2003 |
| NZ | 537874 A | 2/2007 |
| TW | 216773 B | 12/1993 |
| TW | 347343 | 12/1998 |
| WO | 8501449 A1 | 4/1985 |
| WO | 8605116 A1 | 9/1986 |
| WO | 8605705 A1 | 10/1986 |
| WO | 8800494 A1 | 1/1988 |
| WO | 8801529 A1 | 3/1988 |
| WO | 88001895 A1 | 3/1988 |
| WO | 8806200 A1 | 8/1988 |
| WO | 8900880 A1 | 2/1989 |
| WO | 9000434 A1 | 1/1990 |
| WO | 9104783 A1 | 4/1991 |
| WO | 9116124 A1 | 10/1991 |
| WO | 9302779 A1 | 2/1993 |
| WO | 9315827 A1 | 8/1993 |
| WO | 9323152 A1 | 11/1993 |
| WO | 9411094 A1 | 5/1994 |
| WO | 9511736 A1 | 5/1995 |
| WO | 9534424 A1 | 12/1995 |
| WO | 9603202 A1 | 2/1996 |
| WO | 9607470 A1 | 3/1996 |
| WO | 9628236 A1 | 9/1996 |
| WO | 9629142 A1 | 9/1996 |
| WO | 9641676 A1 | 12/1996 |
| WO | 9706880 A2 | 2/1997 |
| WO | 9822204 A1 | 5/1998 |
| WO | 9825694 A1 | 6/1998 |
| WO | 9828066 A1 | 7/1998 |
| WO | 9853902 A1 | 12/1998 |
| WO | 9901207 A1 | 1/1999 |
| WO | 9908773 A1 | 2/1999 |
| WO | 99-55448 A1 | 11/1999 |
| WO | 9959707 A1 | 11/1999 |
| WO | 0018498 A1 | 4/2000 |
| WO | 0021890 A1 | 4/2000 |
| WO | 0030742 A1 | 6/2000 |
| WO | 0100307 A2 | 1/2001 |
| WO | 0105715 A1 | 1/2001 |
| WO | 0108790 A1 | 2/2001 |
| WO | 0119414 A1 | 3/2001 |
| WO | 0132299 A1 | 5/2001 |
| WO | 0136075 A1 | 5/2001 |
| WO | 0143856 A1 | 6/2001 |
| WO | 0145829 A1 | 6/2001 |
| WO | 0226363 A2 | 4/2002 |
| WO | 0230550 A1 | 4/2002 |
| WO | 0240140 A1 | 5/2002 |
| WO | 0247800 A1 | 6/2002 |
| WO | 03000389 A2 | 1/2003 |
| WO | 03013706 A1 | 2/2003 |
| WO | 2003013706 A1 | 2/2003 |
| WO | 2003024575 A1 | 3/2003 |
| WO | 03053552 A1 | 7/2003 |
| WO | 03057632 A1 | 7/2003 |
| WO | 03059495 A1 | 7/2003 |

(56) References Cited

FOREIGN PATENT DOCUMENTS

| | | |
|---|---|---|
| WO | 03068374 A1 | 8/2003 |
| WO | 2003095078 A1 | 11/2003 |
| WO | 2004018084 A1 | 3/2004 |
| WO | 2004024304 A2 | 3/2004 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | 2004101120 A1 | 11/2004 |
| WO | 2005005028 A1 | 1/2005 |
| WO | 2005021140 A1 | 3/2005 |
| WO | 2005028085 A1 | 3/2005 |
| WO | 2005028086 A1 | 3/2005 |
| WO | 2005037414 A1 | 4/2005 |
| WO | 2005046849 A1 | 5/2005 |
| WO | 2005070524 A1 | 8/2005 |
| WO | 2005077499 A1 | 8/2005 |
| WO | 2005082498 A1 | 9/2005 |
| WO | 2005107929 A2 | 11/2005 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006066319 A1 | 6/2006 |
| WO | 2006066350 A1 | 6/2006 |
| WO | 2006126833 A1 | 11/2006 |
| WO | 2007022576 A1 | 3/2007 |
| WO | 2007053528 A2 | 5/2007 |
| WO | 2007065956 A1 | 6/2007 |
| WO | 2007073080 A1 | 6/2007 |
| WO | 2007135087 A1 | 11/2007 |
| WO | 2008025077 A1 | 3/2008 |
| WO | 2008034570 A1 | 3/2008 |
| WO | 2008071516 A1 | 6/2008 |
| WO | 2008141080 A1 | 11/2008 |
| WO | 2008153818 A1 | 12/2008 |
| WO | 2009030405 A1 | 3/2009 |

OTHER PUBLICATIONS

Anonymous, "Nonwoven Constructions of Dyneon "THV and Dyneon "The Fluorothermoplastics", Research Disclosure Journal, Apr. 1999, RD 420013, 2 pages.
Cote et al., Wat. Sci. Tech. 38(4-5) (1998), pp. 437-442.
Cote et al. "A New Immersed Membrane for Pretreatment to Reverse Osmosis" Desalination 139 (2001) 229-236.
Crawford et al., "Procurement of Membrane Equipment: Differences Between Water Treatment and Membrane Bioreactor (MBR) Applications" (2003).
Davis et al., Membrane Technology Conference, "Membrane Bioreactor Evaluation for Water Reuse in Seattle, Washington" (2003).
DeCarolis et al., Membrane Technology Conference, "Optimization of Various MBR Systems for Water Reclamation" (2003).
Delgrange-Vincent et al., Desalination 131 (2000) 353-362.
Dow Chemicals Company, "Filmtec Membranes—Cleaning Procedures for Filmtec FT30 Elements," Tech Facts, Online, Jun. 30, 2000, XP002237568.
Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.
Johnson, "Recent Advances in Microfiltration for Drinking Water Treatment," AWWA Annual Conference, Jun. 20-24, 1999, Chicago, Illinois, entire publication.
Jones, Craig, "Applications of Hydrogen Peroxide and Derivatives," The Royal Society of Chemistry, Cambridge, UK 1999 Chapters 2 and 5.
Kaiya et al., "Water Purification Using Hollow Fiber Microfiltration Membranes," 6th World Filtration Congress, Nagoya, 1993, pp. 813-816.
Kang et al. "Characteristics of microfiltration membranes in a membrane coupled sequencing batch reactor system" Water Research, Elsevier, Amsterdam, NL, vol. 37, No. 5, Mar. 2003.
Lloyd, D.R. et al. "Microporous Membrane Formation Via Thermally Induced Phase Separation/Solid-Liquid Phase Separation" Journal of Membrane Science (Sep. 15, 1990), pp. 239-261, vol. 52, No. 3, Elsevier Scientific Publishing Company, Amsterdam, NL.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
Mark et al., "Peroxides and Peroxy Compounds, Inorganic" Kirk—Othmer Encyclopedia of Chemical Technology, Peroxides and Peroxy Compounds, Inorganic, to Piping Systems, New York, Wiley & Sons, Ed., Jan. 1, 1978, pp. 14-18.
Nakayama, "Introduction to Fluid Mechanics," Butterworth-Heinemann, Oxford, UK, 2000.
Ramaswammy S. et al. "Fabrication of Ply (ECTFE) Membranes via thermally induced phase Separation", Journal of Membrane Science, (Dec. 1, 2002), pp. 175-180, vol. 210 No. 1, Scientific Publishing Company, Amsterdam, NL.
Rosenberger et al., Desalination, 151 (2002), pp. 195-200.
U.S. Appl. No. 60/278,007, filed Mar. 23, 2001.
Ueda et al., "Effects of Aeration on Suction Pressure in a Submerged Membrane Bioreactor," Wat. Res. vol. 31, No. 3, 1997, pp. 489-494.
Water Encyclopedia, edited by Jay Lehr, published by John Wiley & Sons, Inc., Hoboken, New Jersey, 2005. Available at http://wwwmrw.interscience.wiley.com/eow/.
Webster's Ninth New Collegiate Dictionary, Merriam-Webster Inc., Publishers, Springfield, Massachusetts, USA, Copyright 1986, p. 1298.
White et al., The Chemical Engineering Journal, 52 (1993), pp. 73-77.
Wikipedia, "Seawater," available at http://en.wikipedia.org/wiki/Seawater, Jul. 15, 2007.
Yamamoto et al., Water Science Technology, vol. 2, pp. 43-54; 1989.
Yoon: "Important operational parameters of membrane bioreactor-sludge disintegration (MBR-SD) system for zero excess sludge production" Water Research, Elsevier, Amsterdam, NL, vol. 37, No. 8, Apr. 2003.
Zenon, "Proposal for ZeeWeed® Membrane Filtration Equipment System for the City of Westminster, Colorado, Proposal No. 479-499," Mar. 2000, entire publication.
Coulson et al., "Coulson and Richardson's Chemical Engineering," 1999, vol. 1, pp. 358-364.
Cui et al., "Airlift crossflow membrane filtration—a feasibility study with dextran ultrafiltration," J. Membrane Sci. (1997) vol. 128, pp. 83-91.
Notification of the International Search Report and Written Opinion of the International Searching Authority dated Feb. 7, 2012 for Application No. PCT/US11/52677.
Australian Patent Examination Report No. 1 dated Oct. 4, 2013 for Application No. 2011305377.
Schematic of 4" Geyser Pump, Geyser Pump Tech. Co., Nov. 13, 2005.
Miller et al., "Side Stream Air Lift MBR Development and Successful Application of a New Generation of MBR," Pollution Solutions Brochure, NORIT, The Netherlands, Apr. 2008.
Judd, "The MBR Book: Principles and Applications of Membrane Bioreactors in Water and Wastewater Treatment," (2006), pp. 174-178.
EPA, Membrane Filtration Guidance Manual, Nov. 2005.

* cited by examiner

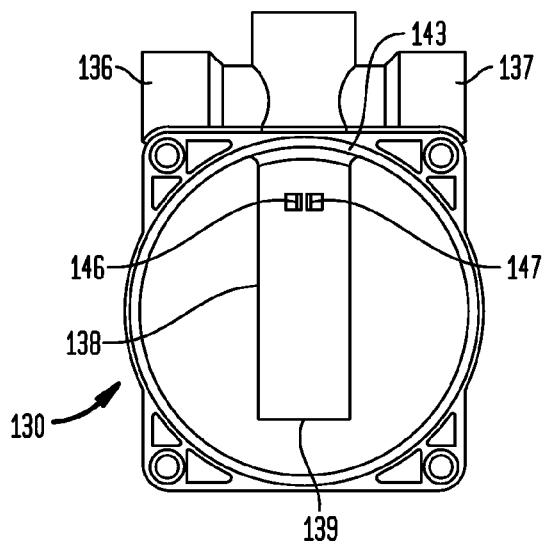
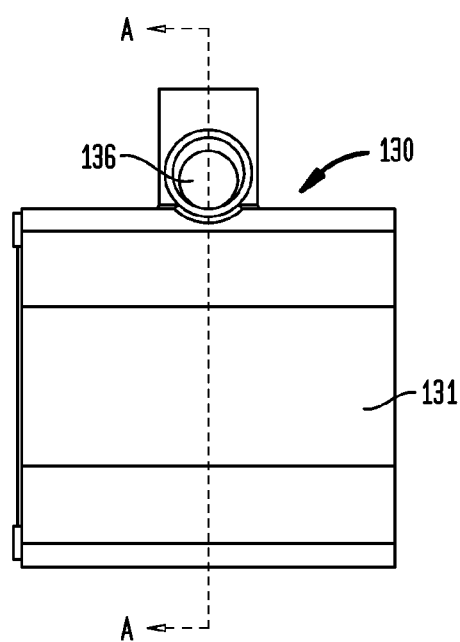
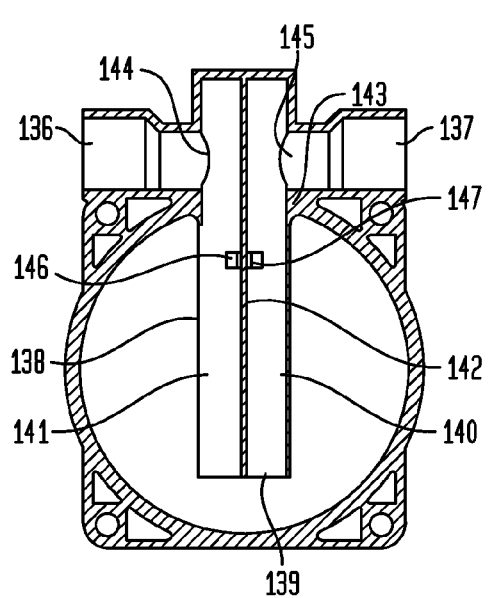

FLUID CONTROL MANIFOLD FOR MEMBRANE FILTRATION SYSTEM

RELATED APPLICATIONS

Foreign priority benefits are claimed under 35 U.S.C. §119 (a)-(d) or 35 U.S.C. §365(b) of Australian provisional application number 2010904334, filed Sep. 24, 2010, the entire contents and substance of which is hereby incorporated by reference in its entirety.

BACKGROUND OF INVENTION

1. Field of Invention

Aspects and embodiments of the present invention relate to membrane filtration systems and, more particularly, to a manifold arrangement for such systems that is used to communicate fluids to and/or from the membranes elements.

2. Discussion of Related Art

Examples of prior art filter cartridges and banks are shown in, for example, International Patent Application PCT/AU87/00309 and PCT/AU90/00470. These applications are herein incorporated by reference in their entireties for all purposes.

In some examples, a hollow fiber filtration module may comprise an elongate tubular casing enclosing a bundle of hollow fiber membranes. At one end of the casing there is a first header which has a feed passageway therethrough. The feed passage is in fluid communication with the interior of the casing and hence the exterior of the fiber membranes. At the other end of the casing there is a second header which has a treated feed passageway therethrough in communication with the interior of the casing and the exterior of the fiber membranes.

At least one of the headers, usually the lower header, may also be provided with a gas conveying passageway in fluid communication with the interior of the casing and the exterior of the fiber membranes.

The passageways may be formed in off-set portions of the headers. The headers may have planar end faces. A plurality of such modules may be joined together without interconnecting manifolds or pipe work to form a row of filter modules. A number of such rows of filter modules may be interconnected to define a bank of filter modules.

SUMMARY OF INVENTION

According to a first aspect of the invention there is provided a manifold for a filtration module assembly. The manifold comprises a body, a first fluid passageway through the body, second and third fluid passageways in fluid communication with respective first and second vertically spaced openings in the first fluid passageway adapted to selectively provide a flow of gas to a passageway of the filter module and means for introducing a pressurized gas into the first fluid passageway.

According to another aspect of the invention there is provided a manifold for a filter module assembly for attachment to first and second headers in fluid communication with filtering membranes. The manifold comprises a body having opposite ends adapted to connect to a substantially similar adjacent manifold or manifolds, a first fluid passageway through the body providing communication from one end of the body to the other so as to permit fluid connection with adjacent manifolds, second and third fluid passageways in fluid communication with respective first and second vertically spaced openings in the first fluid passageway adapted to selectively provide a flow of gas to a passageway of the filter module, and means for introducing a pressurized gas into the first fluid passageway.

In some embodiments, the second and third passageways comprise a single passageway.

In some embodiments, the first passageway fluidly communicates with opposed ends of the header and with a third face of the header which is adapted to communicate with the filter module assembly.

According to another aspect of the invention there is provided a method of controlling a flow of gas to a membrane filtration module. The method comprises providing a manifold for attachment to a passageway of the membrane filtration module, the manifold comprising a body, a first fluid passageway through the body for flowing a feed liquid to the module, second and third fluid passageways in fluid communication with respective first and second vertically spaced openings in the first fluid passageway, and introducing a pressurized gas into the first fluid passageway to displace feed liquid within the first fluid passageway to a level at or below the first vertically spaced opening resulting in a flow of gas through the second passageway into the passageway of the filtration module.

In some embodiments, the feed liquid is displaced through the second vertically spaced opening and the third fluid passageway.

According to another aspect of the invention there is provided a filter module assembly. The filter module assembly comprises a body defining a filter chamber, a filter media in the chamber dividing the chamber into a feed side and a filtrate side, a feed inlet to the chamber and a filtrate outlet from the chamber, and a header in fluid communication with the chamber, The header includes a feed passageway extending therethrough having an inlet at one end for receiving feed to be treated, an outlet at the other end adapted to be connected to the inlet of the feed passageway of an adjacent header and a discharge port for delivering feed to the chamber, and a gas distribution passageway extending therethrough and lying within the feed passageway. The gas distribution passageway includes a receiving port for receiving gas from a fluid control manifold according the first aspect of the invention, an outlet at the one end adapted to be connected to an inlet of the gas distribution passageway of an adjacent header, and one or more openings for discharging gas into the feed passageway.

According to another aspect of the invention there is provided a filter module assembly. The filter module assembly comprises an elongate feed containing vessel, a bundle of hollow, porous, fiber membranes within the vessel, a potting head at one end of the vessel in which one end of the bundle of fibers is mounted whereby the potting head prevents flow of fluid out of the one end of the bundle of fibers other than through open ends of the lumens of the fibers, means for closing the other end of the vessel, and means for preventing flow of feed into the other end of the lumens of the bundle of fibers, and a header at the one end of the vessel. The header includes a feed passageway extending therethrough having an inlet at one end for receiving feed to be treated, an outlet at the other end adapted to be connected to the inlet of the feed passageway of an adjacent header and a discharge port for delivering feed to the vessel, a filtrate passageway extending therethrough and lying within the feed passageway, the filtrate passageway having a receiving port for receiving filtrate from the fiber lumens, an outlet at one end for discharging filtrate and an inlet at the other end adapted to be connected to the outlet of the filtrate passageway of an adjacent first header, and a gas distribution passageway extending therethrough and lying within the feed passageway. The gas distribution passageway includes a receiving port for receiving gas from a fluid control manifold according the first aspect of the invention, an outlet at the one end adapted to be connected to an inlet of the gas distribution passageway of an adjacent header and one or more openings for discharging gas into the feed passageway.

In some embodiments, the module assembly is adapted for crossflow filtration and as such the means closing the other end of the casing includes a second header at the other end of the vessel and the means preventing flow of feed into the other end of the lumens is replaced by a second potting head in which the other end of the bundle of fibers is mounted whereby the second potting head permits flow of feed out of the other end of the vessel and permits filtrate to be discharged through the fiber lumens at the other end of the bundle of fibers to the second header.

In some embodiments, the filter media comprises porous hollow membranes and in some embodiments, the membranes comprise hollow fiber membranes.

In some embodiments, the vessel operates as a pressurized vessel during the filtration process.

According to some aspects of the invention, there is provided a manifold for attachment to a header of a filter module assembly. The manifold comprises an inlet in fluid communication with a source of feed liquid, a first outlet in fluid communication with the header, a first fluid passageway in fluid communication with the inlet, a source of gas, and the first outlet, a second fluid passageway in fluid communication with the header and the first fluid passageway, and a second outlet vertically displaced from the first outlet and in fluid communication between the first fluid passageway and the second fluid passageway.

In some embodiments, the second fluid passageway is in fluid communication with an aeration system of the filter module assembly.

In some embodiments, the first fluid passageway is in fluid communication with a feed inlet of the filter module assembly.

In some embodiments, the manifold further comprises a control port formed in a wall of the first fluid passageway, the control port including an open lower portion defining the first outlet and a control port wall defining the second outlet.

In some embodiments, the second fluid passageway comprises an open-ended conduit extending generally downward from an upper wall of the first fluid passageway, a lower end of the open-ended conduit defining the first outlet, the second outlet being defined in a wall of the open-ended conduit.

In some embodiments, second outlet comprises at least one vertically extending aperture.

In some embodiments, the vertically extending aperture comprises an open-ended slot contiguous with the lower end of the tube.

In some embodiments, the manifold further includes a plurality of output conduits, the open-ended conduit being vertically partitioned to form a plurality of passageways within the open-ended conduit, each of the plurality of passageways being in fluid communication with a respective output conduit.

In some embodiments, the manifold comprises at least two of the open-ended conduits.

According to some aspects of the invention, there is provided a method of controlling a flow of gas to a membrane filtration module. The method comprises providing a manifold for attachment to a header of the membrane filtration module. The manifold includes an inlet in fluid communication with a source of feed liquid, a first outlet in fluid communication with the header, a first fluid passageway in fluid communication with the inlet, a source of gas, and the first outlet, a second fluid passageway in fluid communication with the header and the first fluid passageway, and a second outlet vertically displaced from the first outlet and in fluid communication between the first fluid passageway and the second fluid passageway. The method further comprises introducing feed liquid into the first fluid passageway, displacing the feed liquid within the first fluid passageway to a level at or below the second outlet and above the first outlet by introducing a pressurized gas into the first fluid passageway, and flowing the pressurized gas through the first outlet and into the filtration module.

In some embodiments, the method further comprises maintaining the level of the feed liquid at a level at or below the second outlet and above the first outlet while flowing the pressurized gas into the membrane filtration module.

In some embodiments, the method further comprises fluidly connecting first fluid passageways of a plurality of manifolds.

According to some aspects of the invention, there is provided a modular filtration system. The modular filtration system comprises a filtration module including, a chamber having a feed inlet and a filtrate outlet, a filter media in the chamber dividing the chamber into a feed side and a filtrate side, a first header in fluid communication with the chamber, and a first manifold. The first manifold includes a manifold inlet in fluid communication with a source of feed liquid, a first manifold outlet in fluid communication with the first header, a first fluid passageway in fluid communication with the manifold inlet, a source of gas, and the first manifold outlet, a second fluid passageway in fluid communication with the header and the first fluid passageway, and a second manifold outlet vertically displaced from the first manifold outlet and in fluid communication between the first fluid passageway and the second fluid passageway.

In some embodiments, the first header includes a first feed passageway in fluid communication with the first manifold outlet and extending through the first header, the first feed passageway having a feed inlet, a feed outlet, and a discharge port in fluid communication with the chamber, and a first gas distribution passageway in fluid communication with the second manifold outlet and extending through the first header and positioned within the first feed passageway, the first gas distribution passageway having a receiving port, a gas outlet, and one or more openings in fluid communication with the first feed passageway.

In some embodiments, the filter media comprises hollow fiber membranes.

In some embodiments, the first header further includes a first filtrate passageway extending through the first header and positioned within the first feed passageway, the first filtrate passageway having a receiving port in fluid communication with lumens of the fiber membranes, and a filtrate outlet.

In some embodiments, the modular filtration system further comprises at least one additional manifold having an inlet in fluid communication with the first fluid passageway.

In some embodiments, the modular filtration system further comprises at least one additional header having a filtrate passageway in fluid communication with the filtrate outlet of the first filtrate passageway.

In some embodiments, the gas outlet of the first gas distribution passageway is in fluid communication with an inlet of a gas distribution passageway of the at least one additional header.

In some embodiments, the feed outlet of the first feed passageway is in fluid communication with an inlet of a feed passageway of the at least one additional header.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labelled in every drawing. In the drawings:

FIG. 18 is an end elevational view of the filtration control manifold of FIG. 17;

FIG. 19 is a side elevational view of the filtration control manifold of FIG. 17;

FIG. 20 is sectional end elevational view taken along line A-A of FIG. 19;

DETAILED DESCRIPTION

Figure 1:
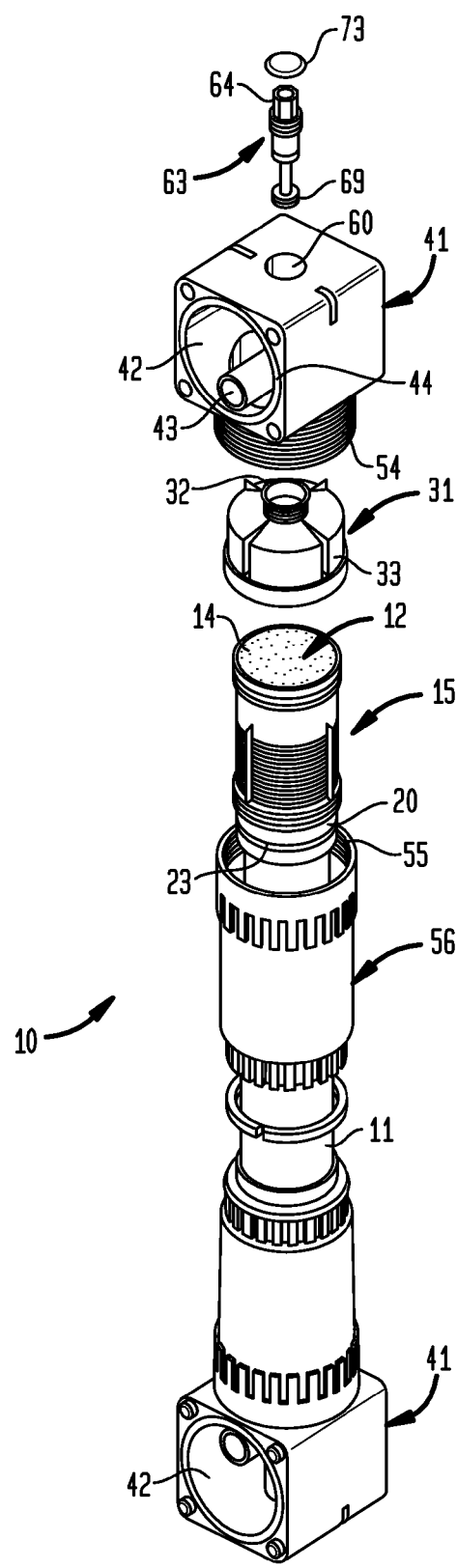
FIG. 1 is an exploded perspective view of a filter module assembly for use with one embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Aspects and embodiments of the present invention will be described with reference to hollow fiber membranes but it is to be understood that the invention is not necessarily limited thereto as it may be applied to systems incorporating other kinds of filter membranes such as porous or permeable membranes in a spiral wound, mat, or sheet form.

Aspects and embodiments of the present invention relate to filter module assemblies composed of filter membrane cartridge assemblies having opposed, symmetrical potting heads attached to either end, although filter membrane cartridges having dissimilar potting heads are also contemplated.

Aspects and embodiments of the present invention relate to filter module assemblies which utilize headers adapted to conduct fluids in the form of feed, filtrate, and gas to other headers, for example, adjacent like headers, and into and out of the filter cartridge assembly to which they are connected.

Aspects and embodiments of the present invention relate to membrane filters whose filter modules comprise elongate bundles of permeable hollow fiber membranes wherein feed to be filtered is applied to the outside of the bundle of fiber membranes and filtrate or permeate is withdrawn from the fiber lumens.

Aspects and embodiments of the present invention relate to membrane filtration systems having multiple filtration modules connected together in a bank of filtration modules. A fluid control module, alternatively referred to herein as a manifold, fluidly communicates a source of feed and a source of aeration gas to headers of one or more of the filtration modules in the bank. The fluid control module and/or filtration module headers may include integrated feed, filtrate, and gas conduits. The fluid control module may be configured to automatically deliver gas to the filtration module headers upon introduction of gas into a feed conduit included within a body of the fluid control module.

An embodiment of a filter cartridge assembly 10 in accordance with the present invention is shown in FIG. 1. The filter cartridge assembly 10 includes a tubular casing 11 that encloses a bundle of hollow, porous, fibers. The bundle of fibers forms the working part of the filter cartridge. Each fiber may have an average pore size of about 0.2 micron, a wall thickness of about 200 microns and a lumen diameter of about 200 microns. There may be about 12,000 hollow fibers in the bundle, but this number, as well as the individual fiber dimensions, may be varied according to operational requirements. The upper ends 14 of the fibers are embedded in a potting head 12, that may include, for example a polyurethane plug, that is cast into an end-piece 15. Around the periphery of the upper end of the end-piece 15 there is a pair of grooves 16 and 17 for receiving O-rings 18 and 19 respectively. The lower end of the end-piece 15 receives a perforated cylindrical screen 20 which encloses the fibers.

The upper portion 23 of the tubular casing 11 includes an outer sleeve 21 including a pair of grooves 25 and 26 which support O-rings 27 and 28 respectively.

In this embodiment, there is a similar end piece (not shown) at the bottom of the tubular casing 11 but such need not be the case if the filter is to be constructed to run in a dead-end mode.

In the case of a dead-end mode filter, the lower ends of the fibers may be sealed with or without being embedded in a potting head.

Mounted on the upper end of the end-piece 15 there is a filtrate cup or housing 31 having a neck or outlet portion 32 and a connecting flange 33, the inner face of which seals against the O-rings 18 and 19. Around the periphery of the neck portion 32 there is a pair of annular grooves 37 and 38 which support O-rings 39 and 40.

The filtrate cup or housing 31 provides an outlet path for the filtrate which is discharged from the open ends 14 of the fibers embedded in the plug or potting head 12.

Figure 2:
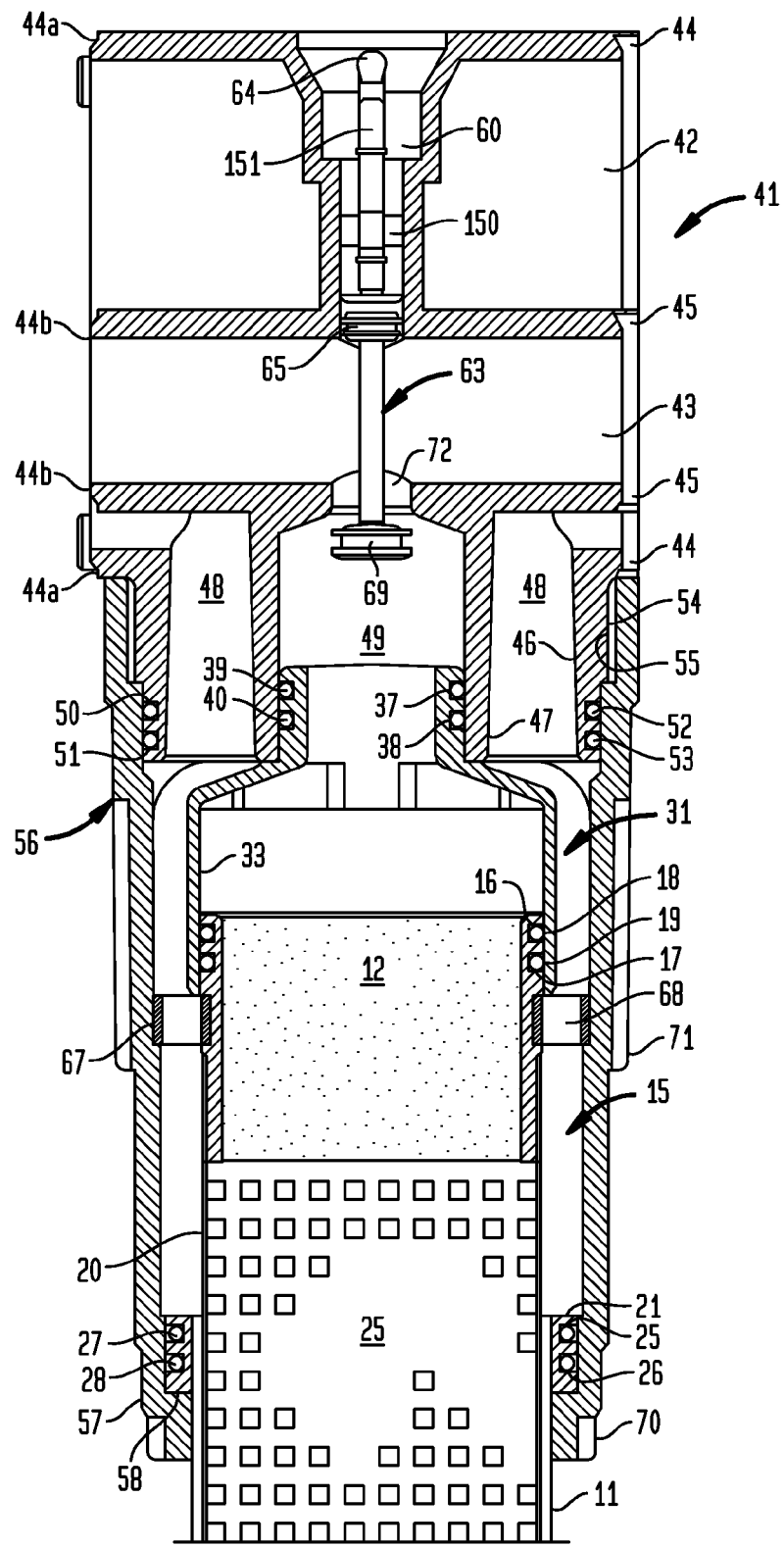
FIG. 2 is a partly broken away sectional view of the top portion of the module of FIG. 1.

At the top of the filter cartridge 10 there is a combined feedstock/filtrate header 41. As illustrated in FIG. 2, in an embodiment of the present invention, the header 41 of the filtration cartridge 10 is adapted to permit the independent passage of at least two fluids. In an upper header of the filtration cartridge, as illustrated in FIG. 2, passage of feed liquid and filtrate may be provided for. In a lower header of the filtration cartridge, passage of feed liquid and gas may be provided for. In some embodiments, filtrate liquid may also be passed through the lower header.

The header 41 is substantially symmetrical about planes which have the longitudinal axis of the filter cartridge assembly lying upon them, particularly the plane which passes at right angles to the predominant direction of flow of both feed and filtrate within the header 41 and the plane which is at right angles to that plane. The symmetrical arrangement allows a greater packing density of modules than would otherwise be the case. In some embodiments, the symmetrical arrangement is been achieved by enclosing the filtrate discharge passageway 43 and gas distribution passageway 124 (illustrated in FIG. 9) entirely within the feedstock inlet passageway 42 within the header 41.

Each header 41 can be abutted against a like header so as to create a row of headers to which a row of membrane cartridges can be connected. In some embodiments, a corresponding row of like headers 41 is attached to the opposite end of each module so as to form a double ended, symmetrical row of modules with the capability of passing both feed and filtrate into and out of each header at each end of each module.

The header 41 has a large feedstock inlet passageway 42 therethrough and a smaller filtrate discharge passageway 43 therethrough. The header 41 has planar side faces and at one side of the header 41 there are grooves 44 and 45 for receiving O-rings around the ends of the passageways 42 and 43. At the opposite side of the header 41 there are annular bevelled projections 44a and 44b adapted to engage the O-rings of an adjacent header 41.

The header 41 has a pair of downwardly extending connection flanges 46 and 47 which respectively define feedstock passageway 48 providing communication between the feedstock passageways 42 and filtrate passageway 49 providing communication between the outlet 32 of the filtrate sleeve 31 and the filtrate discharge passageway 43.

The base of the flange 47 sealingly engages the O-rings 39 and 40 around the neck portion of the filtrate sleeve 31 and at the base of the flange 46 there are annular grooves 50 and 51 which support O-rings 52 and 53 respectively. On the outer face of the flange 46 there is a threaded portion 54 for receiving a correspondingly threaded portion 55 of an outer connecting sleeve 56.

The outer connecting sleeve 56 constitutes a boundary for the feedstock passageway 48 and at its lower end there is a neck portion 57 having an inwardly directed shoulder 58 which engages the lower edge of outer connecting sleeve 56 on the casing 11. Rotation of the outer connecting sleeve 56 to achieve threaded engagement with, or disengagement from, the flange 46 is facilitated by the presence of profiled regions 70 and 71 around the respective perimeters of the outer connecting sleeve 56, as indicated in FIG. 2. In this instance, region 71 has a gear-tooth profile, suitable for engagement with a motorized drive, and region 70 has a castellated profile, suitable for alternative engagement with a C-spanner.

An internal shoulder region 67 on the inner surface of outer connecting sleeve 56 engages with an annular clip 68 which fits around the end-piece 15 at the end of the perforated screen 20 and butts against the end of the filtrate cup 31 such that, when the outer connecting sleeve 56 is fully engaged with the flange 46, the minor end of the filtrate cup 31 is fully inserted within the internal flange 47 of the header 41.

If the need arises to remove or replace the fiber bundle, together with the perforated screen and potted ends, this can be done without disturbing the head pieces when assembled in a filter bank or filter array. After unscrewing the outer connecting sleeve 56 from the header 41, the outer connecting sleeve 56 is slid along casing 11 towards the centre of the cartridge (together with annular clip 68 or after splitting clip 68 into constituent halves) thus permitting the filtrate cup to be drawn back over the potting sleeve for a sufficient distance to extract the minor end of the filtrate cup from the head piece internal skirt, thereby permitting subsequent removal of the filter bundle.

Replacement of a fiber bundle involves following the above described procedure in reverse order.

A shut-off passageway 60 in the header 41 provides access from the exterior of the header 41 to the interior of the filtrate discharge passageway 43 and houses a shut-off valve 63. The top portion 64 of the shut-off valve 63 has an aperture for receiving an adjustment tool (not shown) and for manual activation of the valve. Adjacent the central portion of the shut-off valve 63 is a seal 65 which provides a seal between the shut-off valve 63 and the shut-off passageway 60.

At the lower end of the shut-off valve 63 there is a seal 69. When the shut-off valve 63 is moved upwardly, the seal 69 closes the port 72 to the filtrate discharge passageway 43 to prevent flow of filtrate from the cartridge 10 to the header 41. It is to be noted, however, that closure of the port 72 does not interfere with the flow of filtrate from and to adjacent headers through the filtrate passageway 43. A plug 73 on the top of header 41 closes off the shut-off passageway 60. The valve 63 is so designed that it can be readily operated without resort to any dismantling of component parts of the filter.

In a particular embodiment of the valve arrangement, the plug 73 cannot be replaced when the valve is in the "up" position. This provides visual indication, easily ascertainable at a distance, that the valve is shut off implying that the cartridge which it feeds is disconnected from feed.

The valve 63 is moved from the open position to the closed position by firstly rotating the shaft of the valve 63 through 90°, thereby allowing rectangular block component 150 (mounted on the shaft of the valve 63) to pass through a corresponding rectangular aperture 151 when the shaft of the valve 63 is lifted. Once the shaft of the valve is in the fully up position the shaft is rotated back through 90° once more so that inadvertent lowering of the shaft is prevented by the interaction of blocking piece 150 with the top of shut-off passageway 60. The shut-off valve is opened by a reversal of the procedure.

As indicated in FIG. 1, the bottom of the cartridge 10 is similar to the top in that it has a header 41 and an outer connecting sleeve 56. The filter cartridge 10 could be simply modified to provide for a dead-end mode of operation. The bottom of the cartridge 10 also differs in that it includes a header 41 having further internal gas distribution passageways 124.

Figure 3:
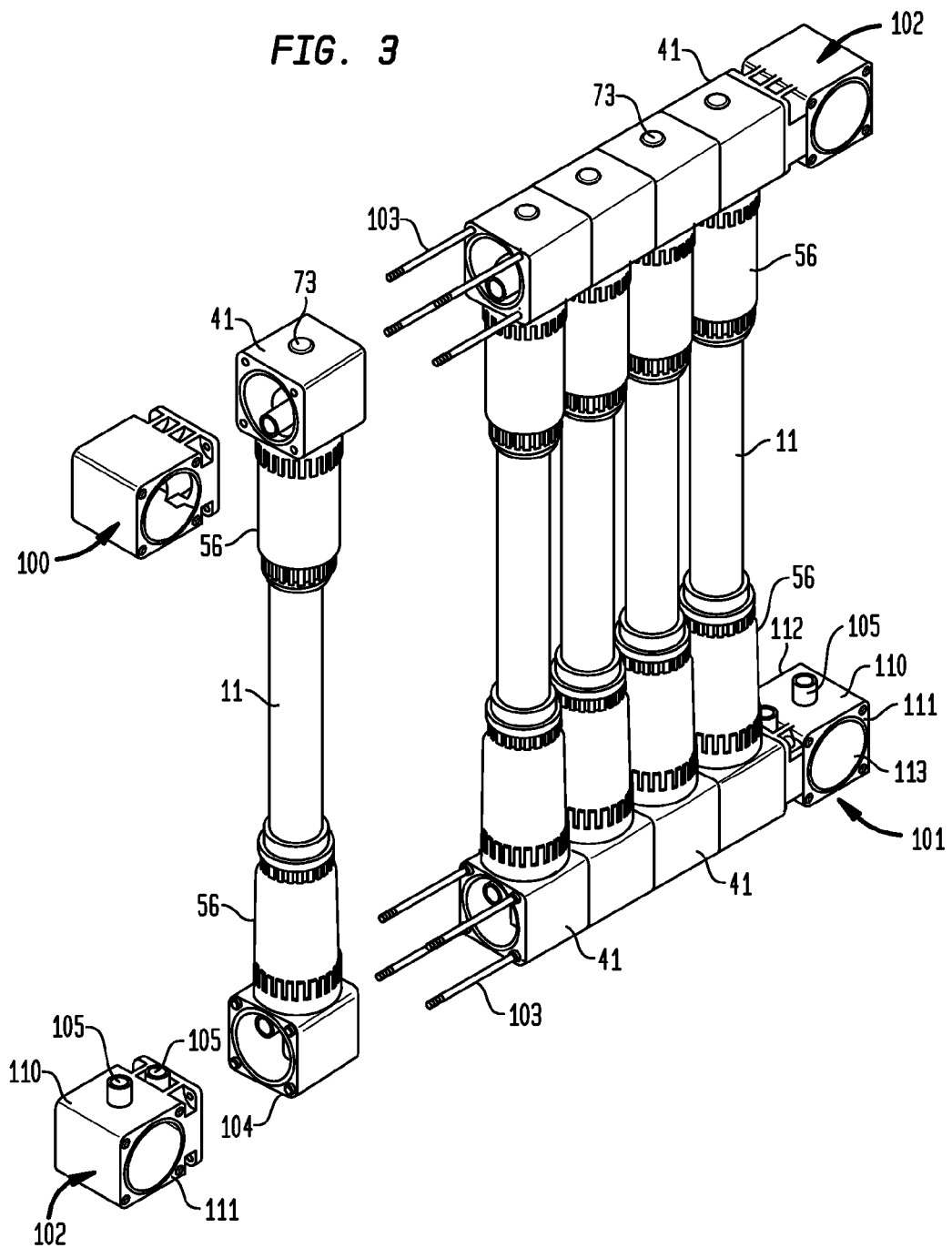
FIG. 3 is partly exploded perspective view of a row of filter modules as shown in FIG. 1.
Figure 4:
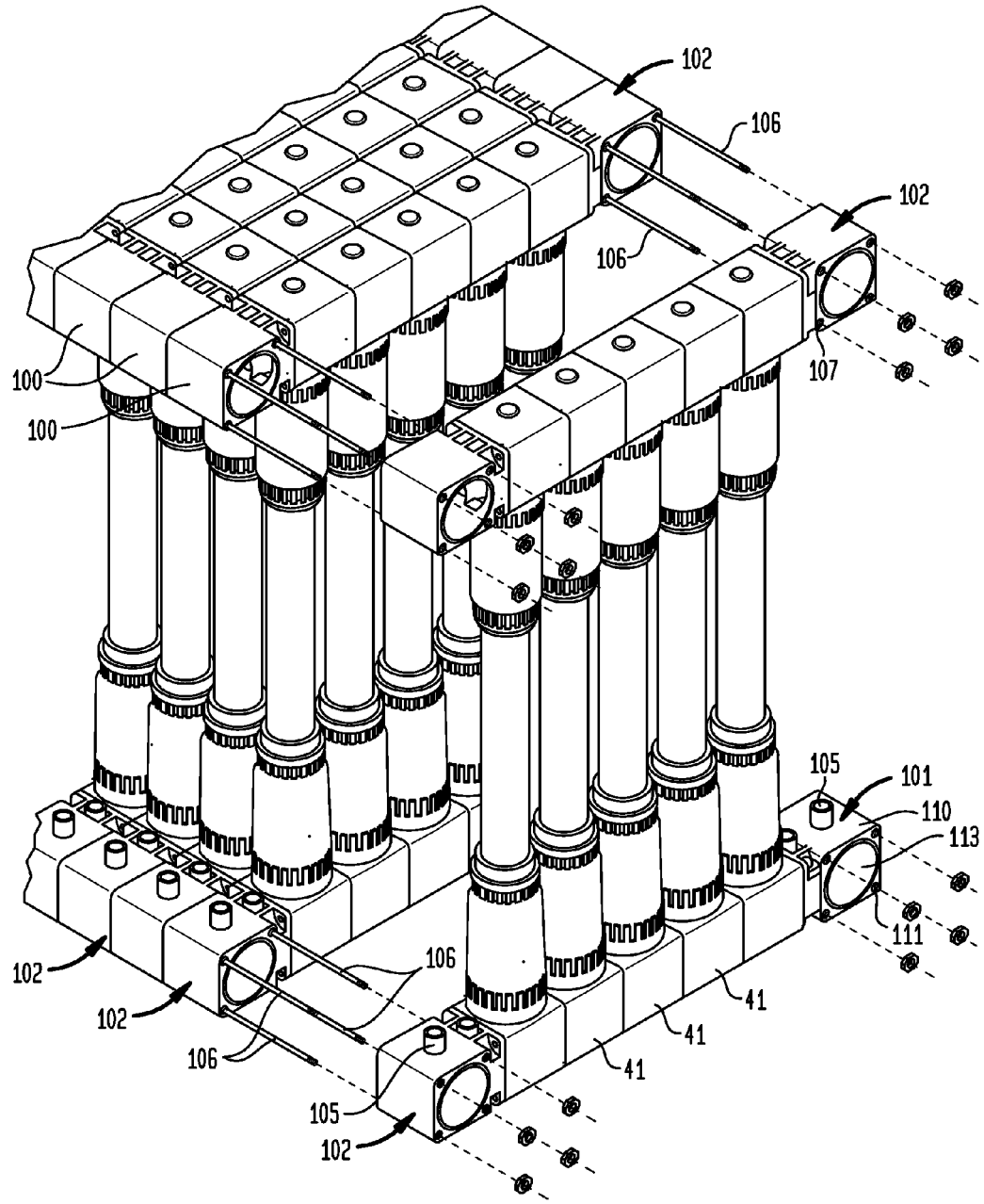
FIG. 4 is partly exploded perspective view of a bank of filter modules as shown in FIG. 3.

FIG. 3 shows a row of filter cartridges 10 connected together in parallel and having a fluid control manifold 101 configured as a feed inlet manifold, fluid control manifold 100 configured as a concentrated feed outlet manifold and fluid control manifolds 102 configured as filtrate manifolds. The row of cartridges 10 are connected together by tie bars 103 which pass through apertures 104 in the header 41. Sample or dosing ports 105 may be provided in the manifolds 100, 101 and 102. FIG. 4 shows a plurality of rows of cartridges connected together through adjacent manifolds 100, 101 and 102 to form a bank of filter modules which are held together by tie bars 106 which pass through apertures 107 in the manifolds 100, 101 and 102. Those skilled in the art will recognize that alternate mechanisms for connecting the manifolds and/or headers together may also or additionally be utilized. For example, the manifolds and/or headers may be provided with clips, intersecting flanges, pressure fit couplings, or screw-like threading adapted to couple to complementary threading on adjacent modules and/or headers.

The fluid control manifolds 100 and 101 illustrated are of the same shape and configuration. In alternate embodiments, the different manifolds may be shaped or configured differently as desired. The manifolds 100 and 101 include a body portion 110 having end faces 111 and 112, which in some embodiments may be planar, and which facilitate connection to an adjacent similar manifold. The body portion 110 defines a feed passageway 113 which extends through the body from end face 111 to end face 112. Either or both of the end faces 111, 112 may include a feed inlet into the feed passageway 113. Around the opening to the passageway 113 in face 112 there is an annular recess (not shown) for receiving an O-ring and around the opening to the passageway 113 and end face 111 there is a bevelled annular projection (not shown) adapted to engage an O-ring of an adjacent manifold.

Embodiments of fluid control manifolds in accordance with the present invention comprise a block shaped structure having one pair of opposed, generally parallel faces bridging a large, generally circular internal passageway. The structure of the manifolds includes two additional passageways adapted to communicate between the main passageway and a third face of the manifolds. These two passageways have two important characteristics: firstly one of the additional passageways may be enclosed entirely within the large, generally circular internal passageway, and secondly, in each manifold one of the two additional passageways is blanked off from the main passageway. Which of the two additional passageways is to be blocked off is determined by whether the manifold is to be used as a feed inlet or a feed outlet manifold.

Utilization of the passageway within a passageway concept allows these manifolds to be used to connect two rows of headers 41 for the purpose of paralleling feed into rows of cartridges and paralleling the removal of filtrate from rows of modules and also for the purpose of connecting such groups of interconnected rows in series with each other. In some embodiments, filtrate may be removed through the additional passageways enclosed entirely within the large, generally circular internal passageway.

Figure 5:
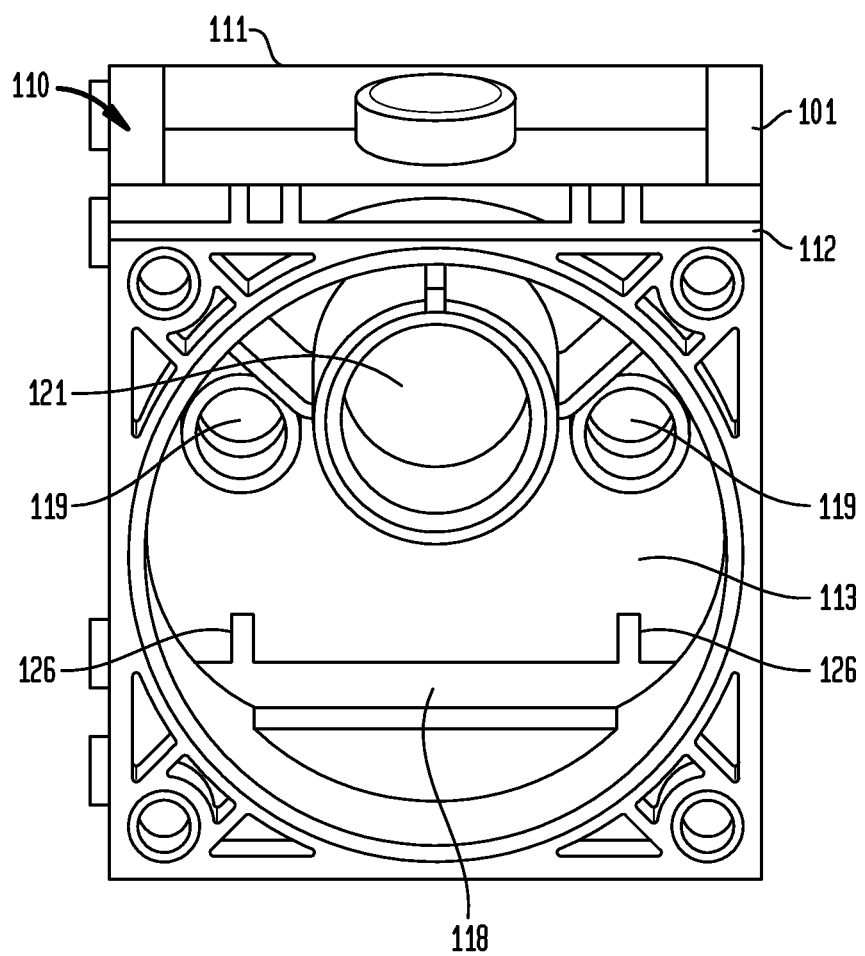
FIG. 5 is an isometric side view of a feed control manifold according to one embodiment of the present invention.

Referring to FIG. 5, there is shown one embodiment of a fluid control manifold according to the invention. As shown, the fluid control manifold 101 comprises a body including side walls defining an open ended feed passageway 113. There are two vertically spaced openings 118 and 119 in one of the side walls. These openings 118 and 119 are outlets of the fluid control manifold 101. In the embodiment shown, a pair of upper openings 119 are provided though it will appreciated the number and type of openings is not narrowly critical. A second passageway 121 extending through and within the feed passageway 113 may be optionally provided when the manifold is also used to conduct permeate from the headers 41.

Figure 6:
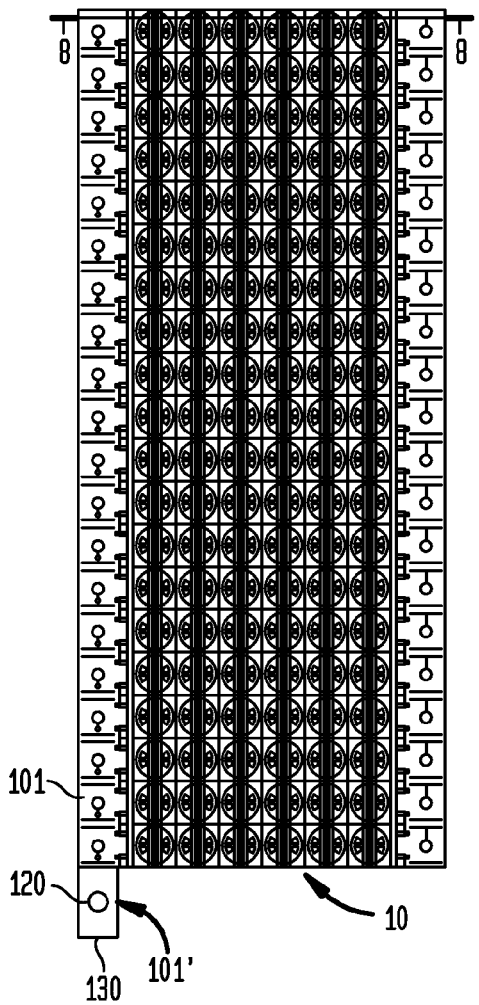
FIG. 6 is a simplified plan view of a bank of filter modules according to one embodiment of the invention.
Figure 7:
FIG. 7 is a simplified partial end elevational view of a lower portion of the bank of filter modules of FIG. 6.

FIG. 6 shows a number of fluid control manifolds 101 connected to the lower headers 41 of a bank of modules 10. The fluid control manifolds are connected to adjacent like manifolds to form a row of interconnected manifolds extending along at least one side of the module bank. Each manifold 101 is further connected to the end of a row of interconnected headers 41 to form the bank structure shown in FIG. 6. At least one terminal end of the row of interconnected fluid control manifolds 101 is provided with a T-piece device 101' which serves to provide fluid communication with a source of feed and a source of gas, typically pressurized air. The T-piece 101' has an upper vertically extending inlet 120 for the introduction of gas from the source of gas and a side, horizontally extending inlet 130 for the introduction of feed liquid. The T-piece 101' is typically connected to the terminal fluid control manifold in the row of interconnected manifolds though it will be appreciated that feed and gas can be introduced at any point along the row of manifolds.

Figure 9:
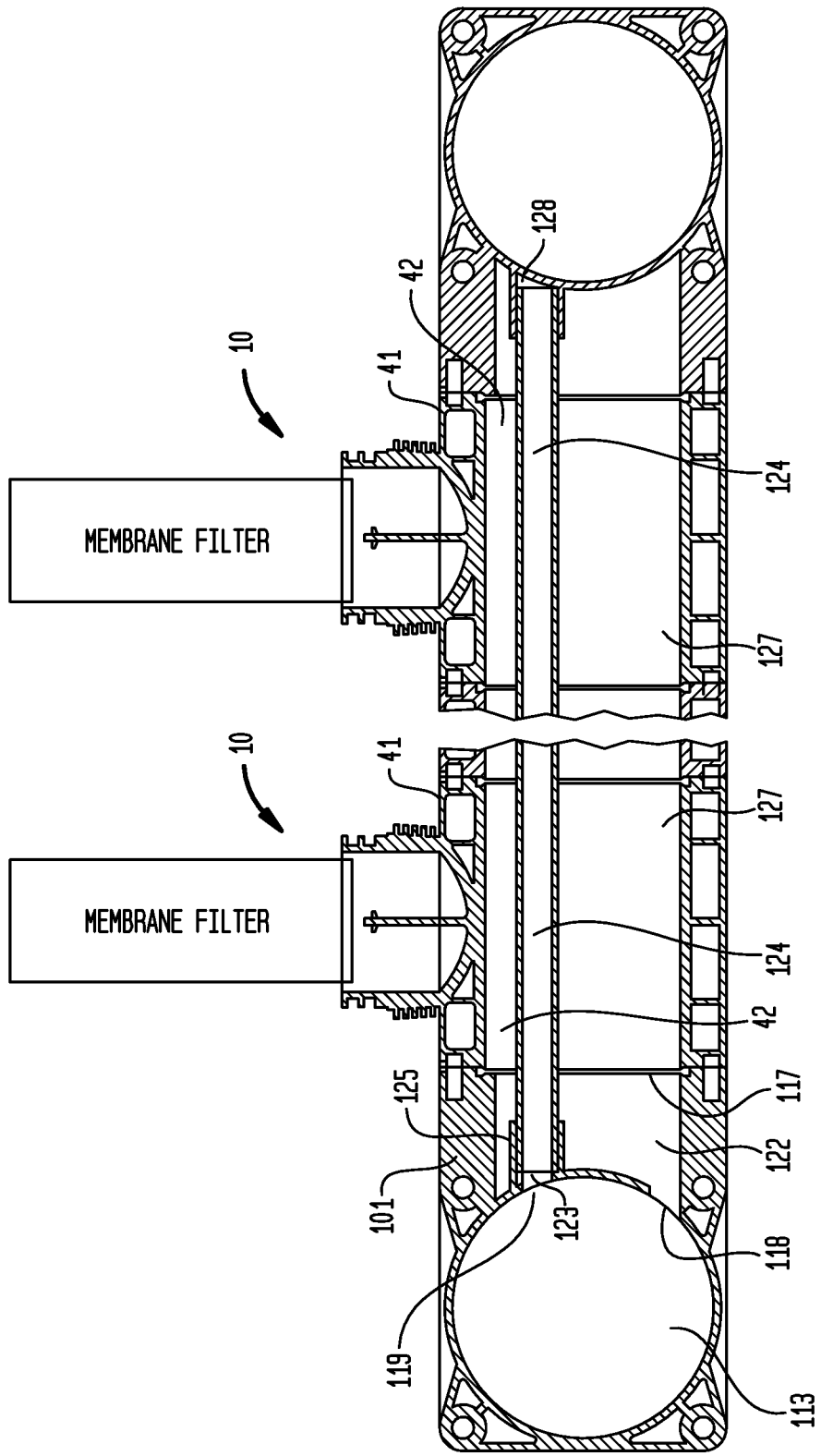
FIG. 9 is a simplified broken side sectional view of the lower portion of a row of filter modules according to the embodiment of the present invention shown in FIG. 6.

Referring to FIG. 9, there is shown a sectional view taken through the fluid control manifolds 101, 102, and headers 41 of an embodiment of a filtration system in accordance with the present invention. The feed passageway 113 of the fluid control manifolds 101, 102 is connected to a source of feed liquid and the lower opening 118 is in fluid communication with a transverse branch passageway 122 which leads to face 117 of the manifold 101 to provide feed communication between the feed passageway 113 and the feed passageway 42 of the header 41. In a similar manner, transverse branch passageway 123 leads from the upper opening 119 to face 117 of the manifold to provide fluid communication to the gas distribution passageway 124 of header 41.

The terminating portions of the gas distribution passageway 124 are each fluidly connected to the end 125 of the branch passageway 123 of the fluid control manifold 101. The gas distribution passageway 124, in this embodiment, is terminated in the final manifold 102 with a blind-end connection 128. The gas distribution passageway 124 of each header 41 is provided with one or more openings 127 in its wall, typically the lower wall, to distribute gas into feed passageway 42 of the header 41. These openings may be in the form of holes, slits, nozzles, or other structures known in the art. The openings in some embodiments be of different sizes, for example increasing in size with distance from the fluid control manifold, to compensate for pressure drop along the gas distribution passageway so that an equal amount of gas is provided to each filtration manifold in a row.

The operation of the fluid control manifold 101 will now be described with reference to FIGS. 10 to 12.

Figure 8:
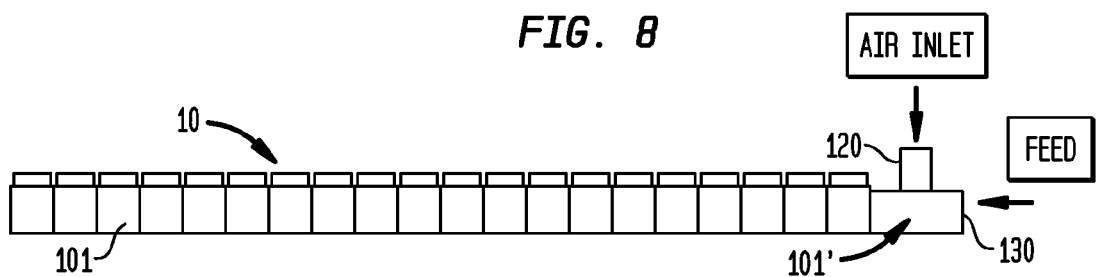
FIG. 8 is a simplified partial side elevational view of a lower portion of the bank of filter modules of FIG. 6.
Figure 10:
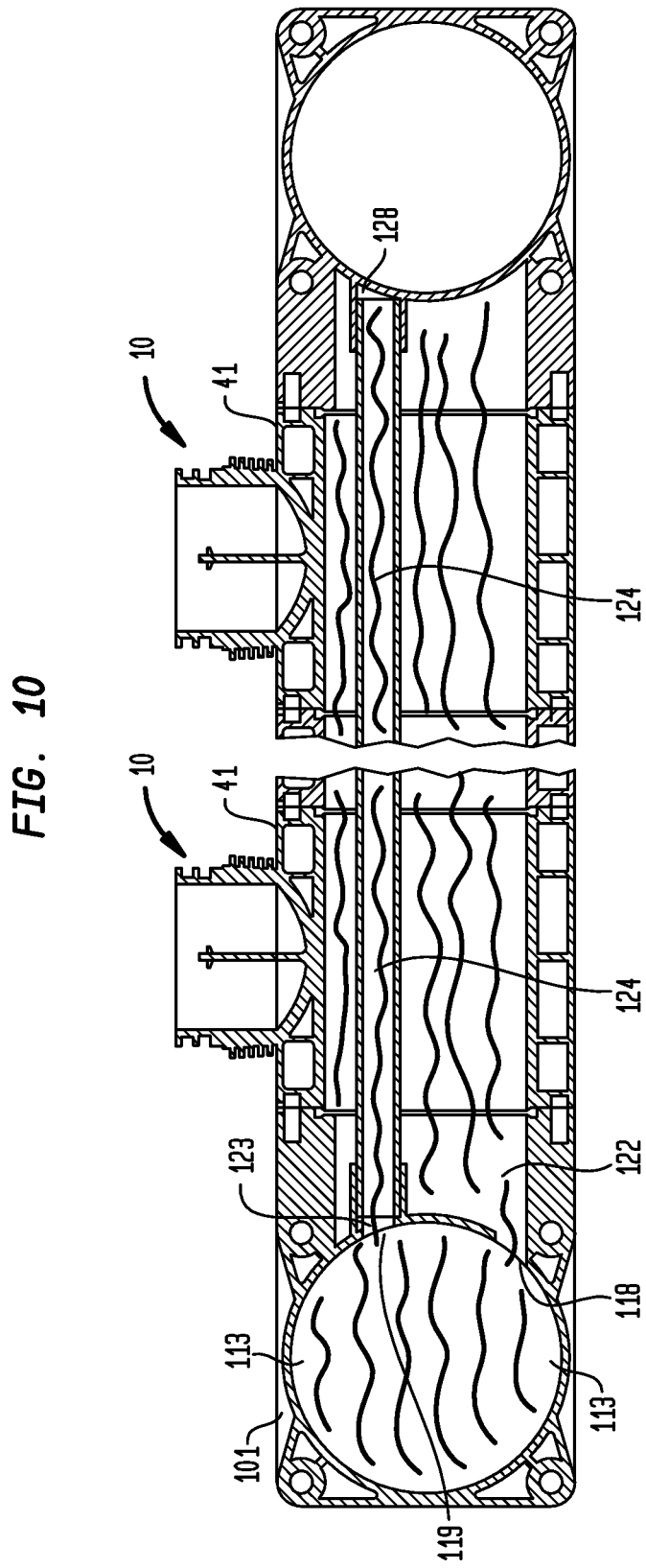
FIG. 10 is a simplified broken side sectional view of the lower portion of a row of filter modules of FIG. 6 illustrating the modules in filtration mode.

FIG. 10 shows the manifold in the normal feed supply mode during filtration with the feed passageway 113 and feed supply passageways 42 of the header 41 being full of feed liquid. In this mode, the branch passageway 123 and the gas distribution passageway 124 are also filled with feed liquid. Feed flows through the feed passageway 113, lower opening 118, and branch passageway 122 into the feed supply passageway 42 and around the membranes of each module 10. The feed is supplied to the feed supply passageway through the T-piece 101' provided at least at one end of a row of interconnected fluid control manifolds 101 as shown in FIGS. 6 and 8.

Figure 11:
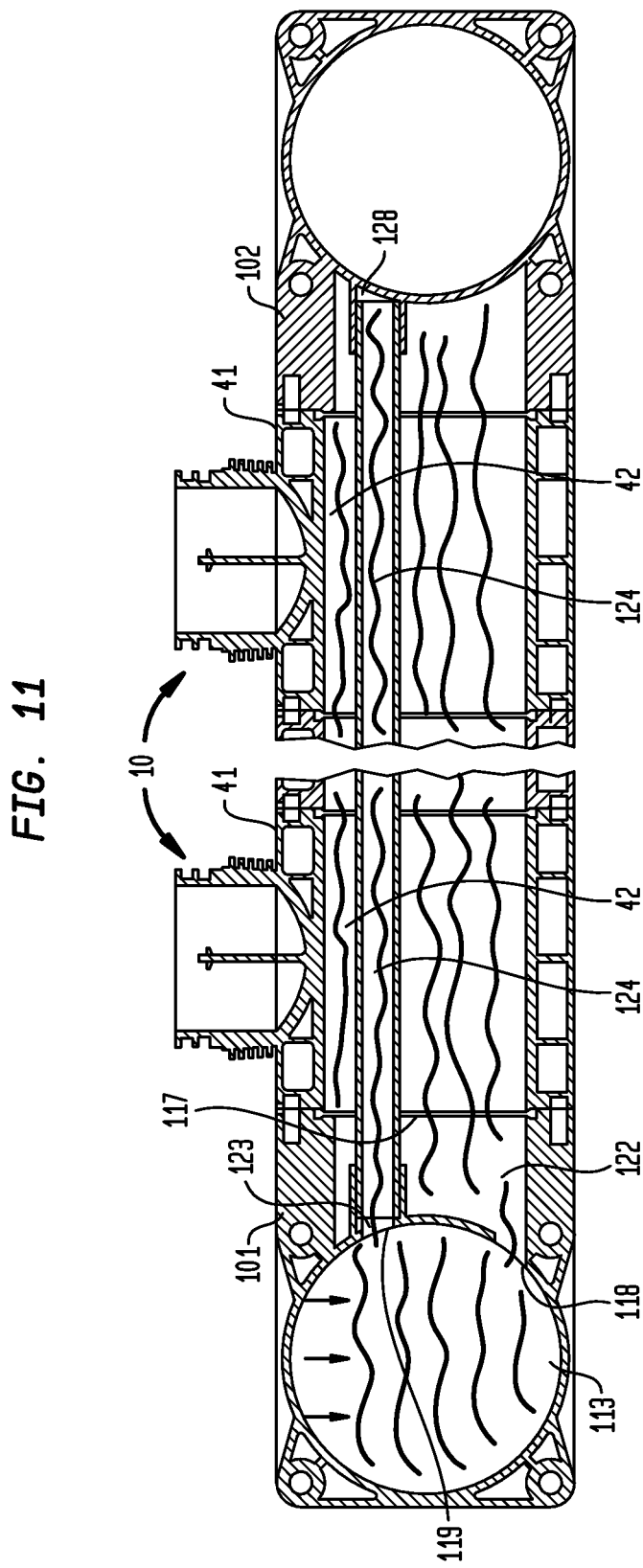
FIG. 11 is a simplified broken side sectional view of the lower portion of a row of filter modules of FIG. 6 illustrating the modules at the beginning of an aeration or gas scouring mode.
Figure 12:
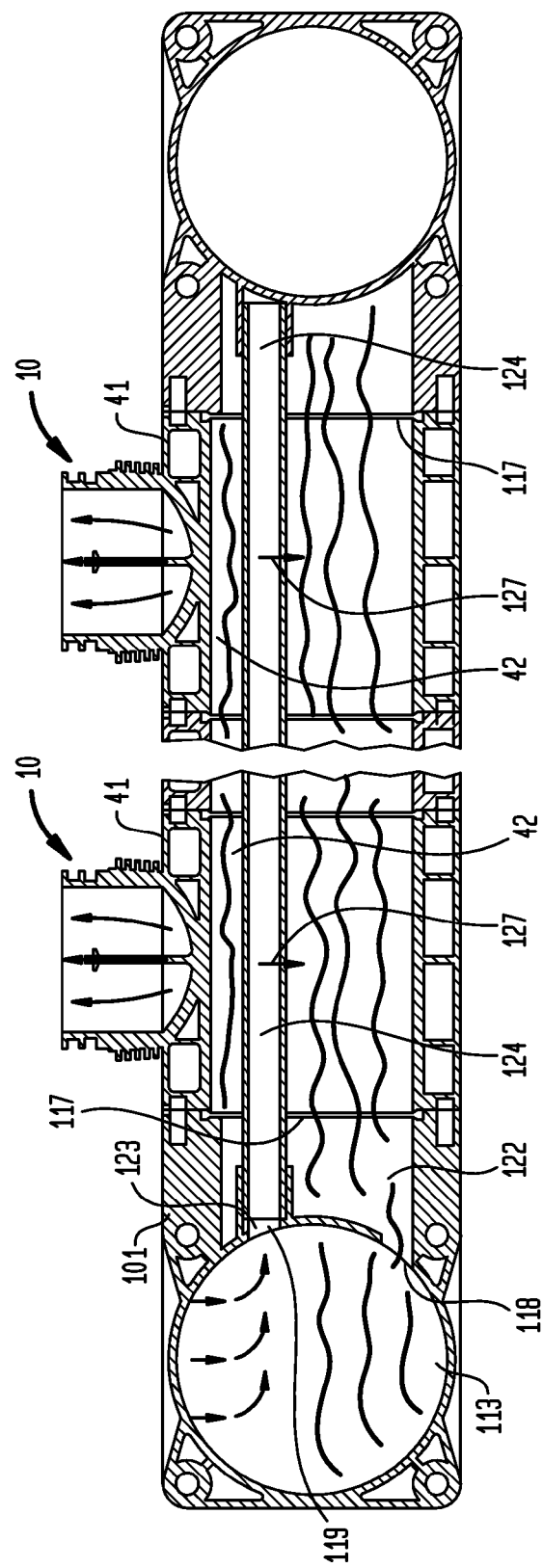
FIG. 12 is a simplified broken side sectional view of the lower portion of a row of filter modules of FIG. 6 illustrating the modules in an aeration or gas scouring mode.
Figure 13:
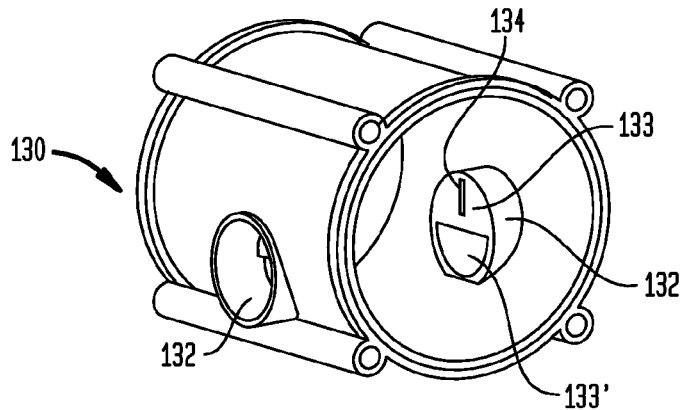
FIG. 13 is perspective view of a filtration control manifold according to another embodiment of the invention.
Figure 14:
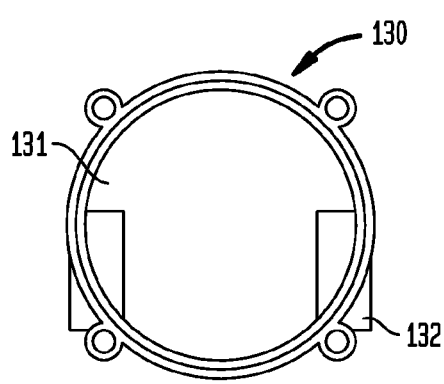
FIG. 14 is an end elevational view of the filtration control manifold of FIG. 13.
Figure 15:
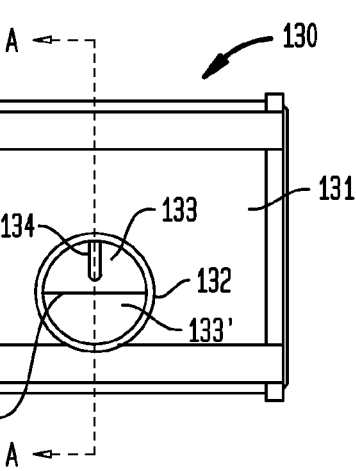
FIG. 15 is a side elevational view of the filtration control manifold of FIG. 13.
Figure 16:
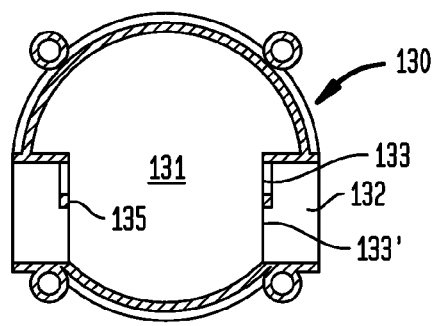
FIG. 16 is sectional end elevational view taken along line A-A of FIG. 15.
Figure 17:
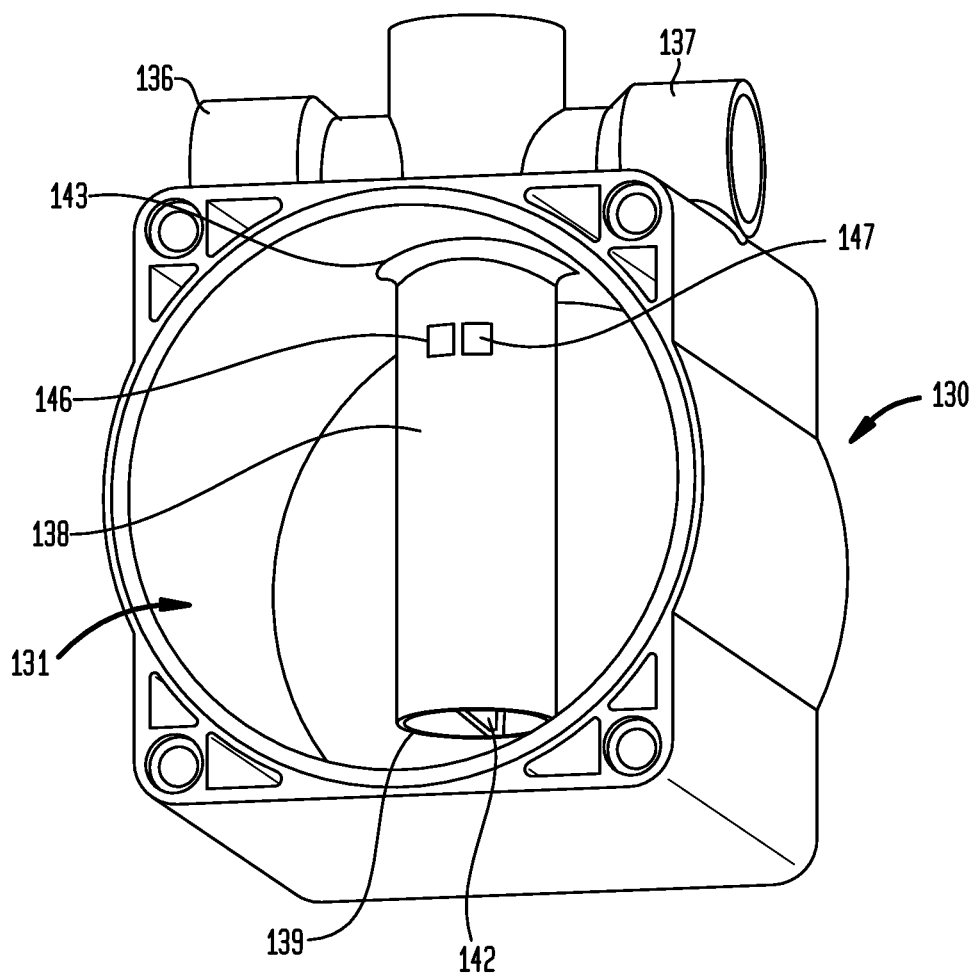
FIG. 17 is perspective view of a filtration control manifold according to another embodiment of the invention.
Figure 21:
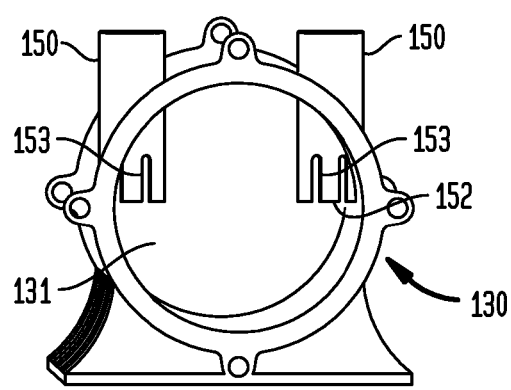
FIG. 21 is perspective view of a filtration control manifold according to another embodiment of the invention.
Figure 22:
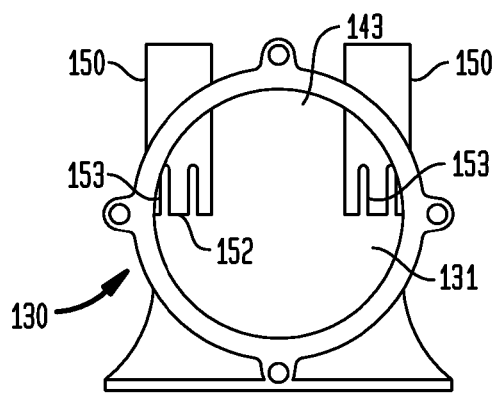
FIG. 22 is an end elevational view of the filtration control manifold of FIG. 21.
Figure 23:
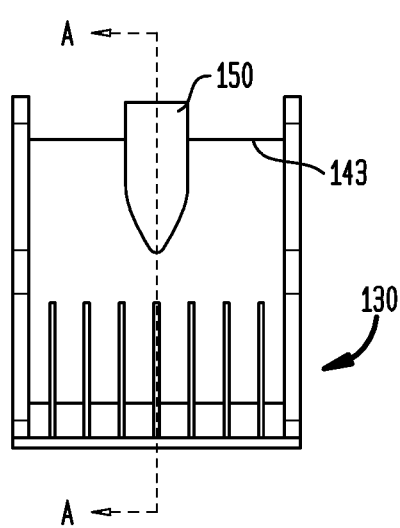
FIG. 23 is a side elevational view of the filtration control manifold of FIG. 21.
Figure 24:
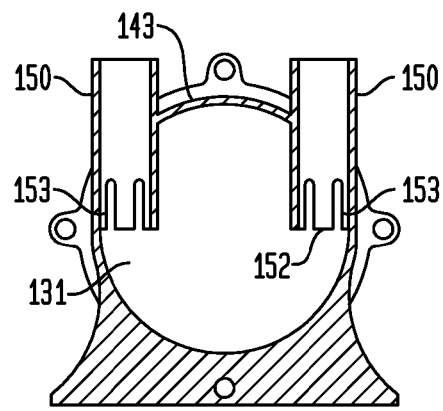
FIG. 24 is sectional end elevational view taken along line A-A of FIG. 23.

As shown in FIG. 11, when aeration or scouring of the membranes is desired, gas, for example, air, is introduced into one or more of the interconnected fluid control manifolds 101. The means of introducing gas is not narrowly critical but is typically done by providing pressurized gas through the T-piece 101' connected to the end of a row of the manifolds 101 as shown in FIG. 8. The introduced gas displaces the feed liquid within the feed supply passageway 113 until the level of liquid within the passageway 113 moves to a level at or below the level of the upper opening 119. At this point gas begins to flow through branch passageway 123 and gas distribution passageway 124 and out through openings 127 to produce gas bubbles in the feed liquid in the feed supply passageways 42 of the header 41 as shown in FIG. 12. The liquid is initially displaced through both upper and lower opening 119 and 118 respectively, with the majority of the flow being through the lower opening 118. To prevent complete displacement of feed liquid from the passageway 113 the lower opening 118 is provided with one or bleed openings 126 at, for example, an upper portion thereof, to bleed off any excess gas and prevent further displacement of feed liquid. The type of bleed opening used is not narrowly critical but may include slots, grooves or indents. Once aeration is complete, the introduction of gas is ceased and the feed liquid rises within the feed passageway 113 and the system returns to normal operation.

In some embodiments, it may be desirable to place the upper openings 119 as high as possible within the feed passageways 113 to minimize the liquid displacement within the feed passageways 113 required to produce an air flow through the gas distribution passageways 124. In some embodiments, it is desirable to retain as much feed as possible within the feed passageways 113 during a gas scouring process. In some embodiments, the upper openings 119 and/or gas distribution passageways 124 are sized sufficiently large to facilitate the production of an even gas distribution amongst the modules fed by the manifolds while still allowing feed flow through the feed passageways 113 and/or 42. Spacing between upper openings 119 and lower openings 118 and the relative positioning of these openings within the feed passageways 113 may be determined based at least in part upon the gas pressure to be used to displace feed liquid within the feed passageways 113.

FIGS. 13 to 16 show another embodiment of a fluid control manifold in accordance with the present invention. In this embodiment, the feed liquid and scouring gas are fed directly into a base of one or more membrane modules from the fluid control manifold 130. The body of the fluid control manifold includes sidewalls defining the feed passageway 131 and one or more control ports 132. Fluid communication between the membrane module (not shown) and the feed passageway 131 of the fluid control manifold 130 is provided via the control port 132. The control port 132 is generally circular in cross-section with its upper hemisphere blocked by a radially extending partition 133 and its lower portion 133' open to provide an outlet to allow liquid flow therethrough. It will be appreciated that the shape of the port 132 is not narrowly critical and other cross-sectional shapes would be equally applicable. The partition 133 is provided with an outlet in the form of aperture 134, which may comprise, for example, a vertically extending slot. The form of aperture 134 is not narrowly critical and a hole or series of holes may also or additionally be used. The aperture 134 is typically spaced vertically from the base 135 of the partition but again this is not critical. In some embodiments, the aperture 134 may be an open ended slot with an open lower end joining the open lower portion 133' of the control port. In the embodiment of FIGS. 13 to 16, a pair of control ports 132 is provided at opposed locations in the side wall of the feed passageway 131.

This embodiment operates in a similar manner to the other embodiments described above. During filtration feed liquid flows through the feed passageway 131 of the fluid control manifold 130 and then through the lower open portion 133' of the control port 132 and into the base of the membrane modules attached thereto (not shown). From the base of the modules the feed liquid flows along the membranes, for example, through openings in the lower potting heads of the modules (not shown).

When air or gas scouring is desired, the liquid within the feed passageway 131 is displaced downwardly by the introduction of gas into the feed passageway 131 until the gas/liquid interface reaches the level of the aperture 134. The gas then passes through the aperture 134 and into the bases of the membrane modules (not shown). The use of a slot formation or a vertically extending group of holes for the aperture 134 allows for regulation of the gas flow by increasing the gas flow through the aperture 134 as more of the liquid is displaced within the feed passageway 131. This, in turn, reduces the displacement of liquid by allowing more gas to escape through the aperture 134. This regulation prevents the control port 132 from becoming completely filled with gas.

FIGS. 17 to 20 show another embodiment of a fluid control manifold in accordance with the present invention. In this embodiment the body of the fluid control manifold includes sidewalls defining the feed passageway 131 and a control port in the form of a conduit 138, for example, a pipe or tube which extends generally vertically downward in a radial direction from an upper wall of the feed passageway 131 and into the feed passageway 131. Feed liquid and gas are fed into one or more, for example, a pair of output conduits 136 and 137 provided above the fluid control manifold 130. Output conduits 136 and 137 are adapted to be connected to the base of membrane modules (not shown). The output conduits 136, 137 are connected in fluid communication with the feed passageway 131 of the fluid control manifold 130 by the conduit 138. The conduit 138 is open at its lower distal end 139 to allow inflow of feed liquid from the feed passageway 131. The conduit 138 is divided into a plurality, for example, a pair of passages 140, 141 by one or more longitudinally extending partitions 142 located along the diameter of the conduit 138 and extending upward from the lower distal end 139. The conduit passes 138 through the upper wall 143 of the feed passageway 131 and is provided with one or more apertures, for example, a pair of openings 144, 145 in its side wall which provide fluid communication between the passages 140 and 141 and respective output conduits 136 and 137. The number of apertures in the conduit 138 may correspond to the number of passages formed therein, with at least one aperture opening into each of the passages. The various apertures may in some embodiments be placed at different heights with in the fluid control manifold.

The conduit 138 is provided with a pair of aeration apertures 146, 147 each communicating with a respective passage 140, 141 of the conduit 138. The number of aeration apertures in the conduit 138 may correspond to the number of passages formed therein, with at least one aperture opening into each of the passages. The aeration apertures 146, 147 are provided at a location spaced vertically from the lower distal end 139 of the pipe or tube 138. This allows gas to flow through the aeration openings 146, 147 without all the liquid within the feed passageway being displaced and prevents the pipe or tube 138 from being completely filled with gas. The various apertures may in some embodiments be placed at different heights with in the feed passageway 131.

This embodiment operates in a similar manner to the other embodiments described above. During filtration, feed liquid flows through the feed passageway 131 and then through the lower open distal end 139 of the conduit 138 and through the passages 140, 141 formed by the partition 142. The feed liquid then flows upward along the passages 140, 141 and out through the respective conduits 136 and 137.

When air or gas scouring is desired, the liquid within the feed passageway 131 is displaced downwardly by the introduction of gas into the feed passageway until the gas/liquid interface reaches the level of the aeration openings 146 and 147. The gas then passes through the openings 146, 147, along the passages 140, 141 of the pipe or tube 138 and into the respective conduits 136 and 137.

FIGS. 21 to 24 show another embodiment of a fluid control manifold in accordance with the present invention. In this embodiment the body of the fluid control manifold includes sidewalls defining the feed passageway 131 and a control port in the form of a conduit 150, for example, a pipe or tube, which extends generally vertically downward in a radial direction from an upper wall of the feed passageway 131 and into the feed passageway 131. The conduit 150 is adapted to be connected to the base of membrane modules (not shown). The feed liquid and gas are fed into the conduit 150. The conduit 150 may in some embodiments pass through a central portion of an upper wall of the fluid control manifold, and in other embodiments, such as illustrated in FIGS. 21 to 24 may enter the fluid control manifold proximate or in contact with a sidewall of the feed passageway 131. The conduit 150 is open at it lower distal end 152 to allow inflow of feed liquid from the feed passageway 131. In some embodiments, the conduit 150 passes through the upper wall 143 of the feed passageway 131 tangentially to an inner wall of the feed passageway 131.

The conduit 150 is provided with one or more aeration apertures 153 near its lower distal end 152. The apertures 153 are in some embodiments provided at equally spaced locations around the circumference of the pipe or tube 150. The apertures 153 are in some embodiments in the form of vertically extending slots, though the form of the apertures is not narrowly critical and a hole or series of spaced holes may also or additionally be used. In some embodiments, one or more of the apertures may be of different widths or lengths than one or more other of the apertures. In some embodiments, where a slot is used it opens into the lower distal end 152 of the conduit 150, as shown in the FIGS. 21 to 24. In this embodiment, a pair of conduits 150 is provided at opposed locations along the inner side walls of the feed passageway 131. In other embodiments, more than two conduits 150 may be included in the manifold.

This embodiment operates in a similar manner to the other embodiments described above. During filtration, feed liquid flows through the feed passageway 131 and then through the lower open distal ends 152 of the conduits 150 and upwardly through the conduits 150 for communication to connected membrane modules (not shown).

When air or gas scouring is desired, the liquid within the feed passageway 131 is displaced downwardly by the introduction of pressurized gas into the feed passageway until the gas/liquid interface reaches the level of the apertures 153. The gas then passes through the apertures 153 and along the conduits 150 for communication with the membrane modules connected thereto (not shown). The use of a slot formation or a vertically extending group of holes for the apertures 153 allows for regulation of the gas flow by increasing the gas flow through the apertures 153 as more of the liquid is displaced within the feed passageway 131. This, in turn, reduces the displacement of liquid by allowing more gas to escape through the apertures 153. This regulation prevents the conduit 150 from becoming completely filled with gas.

The manifold arrangement described enables a single manifold to be used to selectively supply feed and/or gas bubbles to a membrane module.

While exemplary embodiments of the disclosure have been disclosed, many modifications, additions, and deletions may be made therein without departing from the spirit and scope of the disclosure and its equivalents, as set forth in the following claims.

Those skilled in the art would readily appreciate that the various parameters and configurations described herein are meant to be exemplary and that actual parameters and configurations will depend upon the specific application for which the apparatus and methods of the present disclosure are used. Those skilled in the art will recognize, or be able to ascertain using no more than routine experimentation, many equivalents to the specific embodiments described herein. For example, those skilled in the art may recognize that the system, and components thereof, according to the present disclosure may further comprise a network of systems or be a component of a heat exchanger system or water treatment system. It is, therefore, to be understood that the foregoing embodiments are presented by way of example only and that, within the scope of the appended claims and equivalents thereto, the disclosed systems and methods may be practiced otherwise than as specifically described. For example, flat sheet membranes may be prepared and used in the systems of the present disclosure. The present systems and methods are directed to each individual feature, system, or method described herein. In addition, any combination of two or more such features, systems, or methods, if such features, systems or methods are not mutually inconsistent, is included within the scope of the present disclosure.

Further, it is to be appreciated various alterations, modifications, and improvements will readily occur to those skilled in the art. Such alterations, modifications, and improvements are intended to be part of this disclosure, and are intended to be within the spirit and scope of the disclosure. For example, the manifolds may be prepared by any fabrication technique, including injection moulding or welding techniques and be fabricated from any desired material. In other instances, an existing facility may be modified to utilize or incorporate any one or more aspects of the invention. Thus, in some cases, the systems may involve connecting or configuring an existing facility to comprise a filtration system or components of a filtration system, for example the manifolds disclosed herein. Accordingly, the foregoing description and drawings are by way of example only. Further, the depictions in the drawings do not limit the disclosures to the particularly illustrated representations.

Use of ordinal terms such as "first," "second," "third," and the like in the specification and claims to modify an element does not by itself connote any priority, precedence, or order of one element over another or the temporal order in which acts of a method are performed, but are used merely as labels to distinguish one element having a certain name from another element having a same name, but for use of the ordinal term, to distinguish the elements.

What is claimed is:

1. A manifold for attachment to a header of a filter module assembly comprising:
an inlet in fluid communication with a source of feed liquid;

a first outlet in fluid communication with the header;

a first fluid passageway in fluid communication with the inlet, a source of gas, and the first outlet;

a second fluid passageway in fluid communication with the header and the first fluid passageway, the second fluid passageway comprising an open-ended conduit extending generally downward from an upper wall of the first fluid passageway, a lower end of the open-ended conduit defining the first outlet; and a second outlet vertically displaced from the first outlet and in fluid communication between the first fluid passageway and the second fluid passageway, the second outlet being defined in a wall of the open-ended conduit.

2. The manifold of claim 1, wherein the second fluid passageway is in fluid communication with an aeration system of the filter module assembly.

3. The manifold of claim 1, wherein the first fluid passageway is in fluid communication with a feed inlet of the filter module assembly.

4. The manifold of claim 1, further comprising a control port formed in a wall of the first fluid passageway, the control port including an open lower portion defining the first outlet and a control port wall defining the second outlet.

5. The manifold of claim 1, wherein the second outlet comprises at least one vertically extending aperture.

6. The manifold of claim 5, wherein the vertically extending aperture comprises an open-ended slot contiguous with the lower end of the open-ended conduit.

7. The manifold of claim 1, wherein the manifold further includes a plurality of output conduits, the open-ended conduit being vertically partitioned to form a plurality of passageways within the open-ended conduit, each of the plurality of passageways being in fluid communication with a respective output conduit.

8. The manifold of claim 1, comprising at least two of the open-ended conduits.

\* \* \* \* \*